US012589773B2

(12) United States Patent
Hutchinson et al.

(10) Patent No.: US 12,589,773 B2
(45) Date of Patent: Mar. 31, 2026

(54) SYSTEMS AND METHODS FOR SENSOR CALIBRATION AT AN ENERGY SUPPLY STATION

(71) Applicant: TORC Robotics, Inc., Blacksburg, VA (US)

(72) Inventors: John Hutchinson, Blacksburg, VA (US); Joshua Wise, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 0 days.

(21) Appl. No.: 18/221,836

(22) Filed: Jul. 13, 2023

(65) Prior Publication Data

US 2025/0018983 A1 Jan. 16, 2025

(51) Int. Cl.
B60W 60/00 (2020.01)
B60W 50/06 (2006.01)

(52) U.S. Cl.
CPC ........ B60W 60/0025 (2020.02); B60W 50/06 (2013.01); B60W 60/0023 (2020.02); *B60W 2420/403* (2013.01); *B60W 2420/408* (2024.01); *B60W 2554/4029* (2020.02); *B60W 2554/404* (2020.02); *B60W 2756/10* (2020.02)

(58) Field of Classification Search
CPC ............. B60W 60/0025; B60W 50/06; B60W 60/0023; B60W 2420/408; B60W 2756/10
See application file for complete search history.

(56) References Cited

U.S. PATENT DOCUMENTS

| 6,367,516 | B1 | 4/2002 | Christman et al. |
| 8,131,462 | B2 | 3/2012 | Roberts |
| 11,449,055 | B2 | 9/2022 | Goldman et al. |
| 11,584,248 | B2 | 2/2023 | Yu et al. |
| 2017/0327091 | A1 | 11/2017 | Capizzo |
| 2018/0201138 | A1 | 7/2018 | Yellambalase et al. |
| 2019/0111842 | A1 | 4/2019 | Batur et al. |
| 2019/0204427 | A1* | 7/2019 | Abari ..................... G01S 17/86 |
| 2020/0177026 | A1 | 6/2020 | Sosinov et al. |

(Continued)

FOREIGN PATENT DOCUMENTS

| CN | 110340887 A | 10/2019 |
| CN | 114714947 | 7/2022 |

(Continued)

OTHER PUBLICATIONS

"Position resection and intersection", Retrieved from Internet: https://en.wikipedia. org/wiki/Position_resection_and_intersection.

(Continued)

*Primary Examiner* — Toya Pettiegrew
(74) *Attorney, Agent, or Firm* — ARMSTRONG TEASDALE LLP

(57) ABSTRACT

An autonomous vehicle can include a perception sensor and one or more processors. The processors can be configured to automatically control the autonomous vehicle to an energy supply station to resupply the autonomous vehicle; detect an arrival of the autonomous vehicle at the energy supply station; detect a calibration target; collect data from the perception sensor corresponding with the calibration target; and calibrate the perception sensor based on the collected data.

20 Claims, 21 Drawing Sheets

(56) References Cited

U.S. PATENT DOCUMENTS

| | | | |
|---|---|---|---|
| 2021/0197683 A1 | 7/2021 | Graham et al. | |
| 2021/0291679 A1 | 9/2021 | Yu et al. | |
| 2022/0065636 A1 | 3/2022 | DeLizio | |
| 2022/0122383 A1 | 4/2022 | Fritz et al. | |
| 2022/0192771 A1 | 6/2022 | Yu et al. | |
| 2022/0270057 A1* | 8/2022 | Wu | G06Q 10/02 |
| 2022/0366397 A1 | 11/2022 | Gaudin et al. | |
| 2022/0402746 A1 | 12/2022 | Trott | |
| 2023/0009125 A1 | 1/2023 | Hirano et al. | |
| 2023/0058169 A1 | 2/2023 | Cella et al. | |
| 2023/0076693 A1* | 3/2023 | Braun | G01S 7/497 |
| 2023/0182766 A1* | 6/2023 | Chou | G01S 7/40 |
| | | | 701/23 |
| 2023/0249568 A1 | 8/2023 | Hau et al. | |
| 2023/0294644 A1 | 9/2023 | Del Gizzi et al. | |
| 2023/0391223 A1* | 12/2023 | Bucher | B60L 53/80 |
| 2023/0401745 A1* | 12/2023 | Kothari | G06T 7/70 |
| 2024/0059548 A1 | 2/2024 | Vogelaar et al. | |
| 2025/0036831 A1 | 1/2025 | Kim et al. | |

FOREIGN PATENT DOCUMENTS

| | | |
|---|---|---|
| CN | 116700296 | 9/2023 |
| DE | 102012024865 B4 | 9/2018 |
| EP | 2053015 A1 | 4/2009 |
| JP | 2021089673 A | 6/2021 |
| KR | 20210115977 A | 9/2021 |
| WO | 2022246556 | 12/2022 |
| WO | 2024238729 A2 | 11/2024 |

OTHER PUBLICATIONS

"Improving UAV LiDAR survey accuracy using Ground Control Targets", Gert Riemersma, dated Jan. 10, 2021, Retrieved from Internet: https://www.routescene.com/resources/ground-control-targets-for-uav-lidar-accuracy/.

International Search Report and Written Opinion dated Sep. 12, 2024 for International Patent Application No. PCT/US2024/31227.

Office Action (Non-Final Rejection) dated Jan. 13, 2025 for U.S. Appl. No. 18/335,265; (pp. 1-17).

* cited by examiner

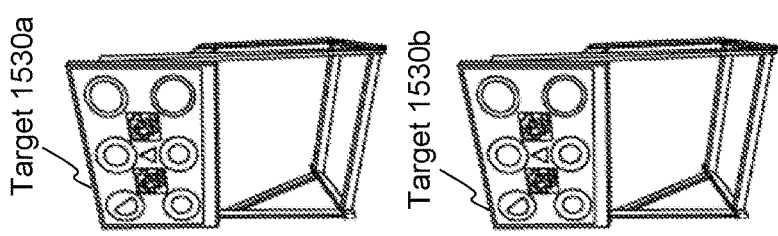
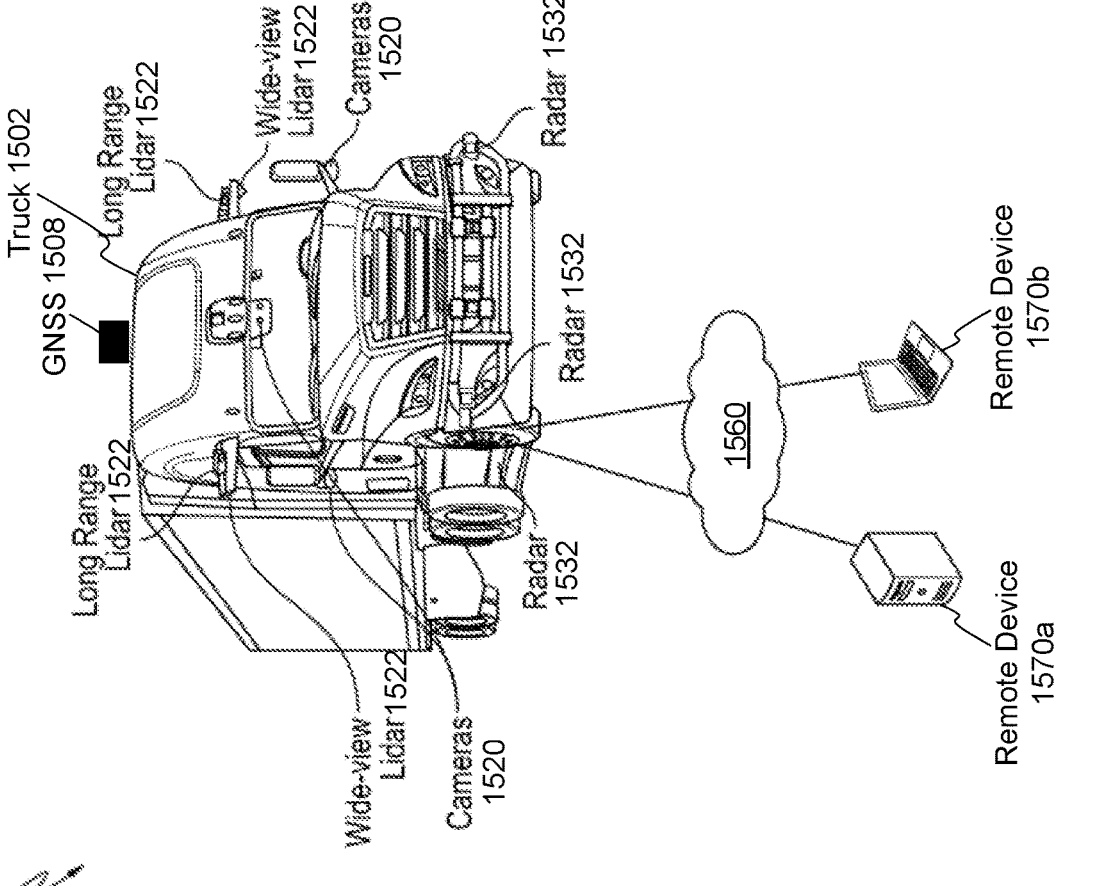
FIG. 15

Truck 1602

Targets 1630a ... 1630n

1600

1600

Truck 1602

Targets 1630a .... 1630n

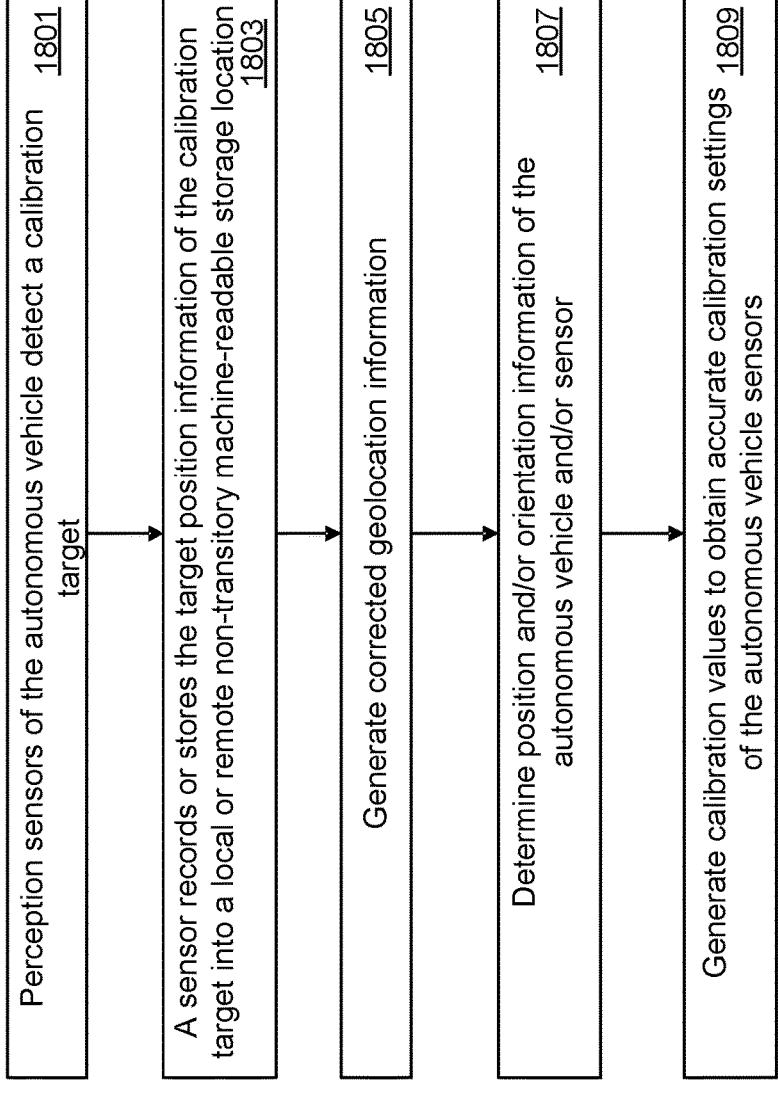

1800

Perception sensors of the autonomous vehicle detect a calibration target 1801

A sensor records or stores the target position information of the calibration target into a local or remote non-transitory machine-readable storage location 1803

Generate corrected geolocation information 1805

Determine position and/or orientation information of the autonomous vehicle and/or sensor 1807

Generate calibration values to obtain accurate calibration settings 1809 of the autonomous vehicle sensors

FIG. 18

SYSTEMS AND METHODS FOR SENSOR CALIBRATION AT AN ENERGY SUPPLY STATION

TECHNICAL FIELD

The present disclosure relates generally to autonomous vehicles and, more specifically, to systems and methods for automatically calibrating perception sensors of autonomous vehicle and supplying energy to an autonomous vehicle via a virtual interface.

BACKGROUND

The use of autonomous vehicles has become increasingly prevalent in recent years, with the potential for numerous benefits, such as improved safety, reduced traffic congestion, and increased mobility for people with disabilities. With the deployment of autonomous vehicles on public roads, there is a growing concern for how the autonomous vehicles will interact with current infrastructure and what additional infrastructure or systems may be implemented to accommodate the functionality of the autonomous vehicles, such as calibrating sensors with high-quality precision and resupplying energy to the autonomous vehicles.

SUMMARY

An automated (e.g., autonomous) vehicle system may not be able to refuel at an energy supply station (e.g., a gas station) in the same manner as a human controlled vehicle (e.g., a dependent vehicle). For example, a human may drive a vehicle to a gas station, open a gas tank, and put a gas pump nozzle into the gas tank to begin refueling. However, an autonomous vehicle, such as a self-driving truck or another self-driving vehicle, may have difficulties performing the same refueling process. For example, an autonomous vehicle cannot grab a gas pump nozzle and start refueling because there may not be a human operator or driver of the autonomous vehicle. The lack of infrastructure designed or configured to support refueling of autonomous vehicles may result in an inability for autonomous vehicles to refuel, loss of functionality for autonomous vehicles, and reduced range of travel for autonomous vehicles.

An energy supply station computer implementing the systems and methods described herein may overcome the aforementioned technical deficiencies. For example, the energy supply station computer may operate to detect, via one or more sensors, an arrival of an autonomous vehicle at an energy supply station. The energy supply station computer may transmit, to a remote computer, a signal comprising image or video data depicting a surrounding environment that includes the autonomous vehicle and the energy supply station. The energy supply station computer may receive, from the remote computer, one or more instructions for moving a mechanical arm of the energy supply station to refuel the autonomous vehicle. Once in contact or coupled with the autonomous vehicle, the energy supply station computer may supply the autonomous vehicle with energy (e.g., petrol, diesel, electricity, natural gas, etc.).

To generate the instructions for moving the mechanical arm, the remote computer may receive the image or video data. The remote computer may receive, from the autonomous vehicle, a second signal comprising second image or video data of the surrounding environment. In some cases, the first and second image or video data include the energy supply station, the autonomous vehicle, and other aspects (e.g., objects) of the physical environment from multiple points of view and angles. The remote computer may generate a virtual interface (e.g., augmented reality, virtual reality, etc.) that depicts the physical environment. For example, an operator (e.g., user) of the remote computer may use a head wearable device and/or a hand wearable device with multiple sensors. The remote computer may transmit a live feed of the physical environment (e.g., the virtual interface) to the head wearable device to display for the operator. The hand wearable device may detect movement of the operator (e.g., movements of each finger, the hand, and arm of the operator) via the sensors and transmit movement data associated with the detected movements to the remote computer. The remote computer may generate the instructions for moving the mechanical arm based on the movement data. In some cases, the remote computer may determine that an energy delivery receptacle (e.g., a nozzle) of the energy delivery system is in contact with or coupled with an energy input receptacle (e.g., a gas tank input, a charging port, etc.) of the autonomous vehicle. Responsive to the determination, the remote computer may command the computer to supply energy to the autonomous vehicle.

For the autonomous vehicle to arrive at the energy supply station, a vehicle computer may obtain, via one or more sensors, data regarding the environment surrounding the autonomous vehicle. For example, the vehicle computer may determine to refuel (e.g., resupply) the autonomous vehicle and control the autonomous vehicle towards the energy supply station. The vehicle computer may process data obtained from a first set of sensors (e.g., at a front of the vehicle) to detect an object corresponding to the energy supply station. The vehicle computer may control the autonomous vehicle to stop at a predefined location in relation to the energy supply station and the object. Responsive to detecting the object, the vehicle computer may switch from processing the data from the first set of sensors to processing data from a second set of sensors (e.g., at a side of the vehicle associated with the energy input receptacle). The vehicle computer may transmit the data from the second set of sensors to the remote computer to generate the virtual interface. The vehicle computer may open the energy input receptacle to receive energy from the energy supply station.

In at least one aspect, the present disclosure describes an energy supply station. The energy supply station can include one or more sensors, a mechanical arm, an energy delivery receptacle, and one or more processors coupled with the one or more sensors. The one or more processors can be configured to detect an arrival of a vehicle at the energy supply station; transmit an indication of the arrival to a remote computer, causing activation of a virtual interface; and move the mechanical arm to cause the energy delivery receptacle to contact or couple with an energy input receptacle of the vehicle.

In another aspect, the present disclosure describes a controller. The controller can include one or more processors configured to receive an indication of a detection of a vehicle from an energy supply station comprising a mechanical arm, and an energy delivery receptacle coupled with the mechanical arm, the energy delivery receptacle configured to deliver energy to vehicles; activate a virtual interface responsive to receiving the indication of the detection of the vehicle from the energy supply station; receive one or more inputs from an input device indicating directions to move the mechanical arm; and transmit the one or more inputs to the energy supply station, wherein receipt of the one or more inputs causes the energy supply station to move the mechanical arm according to the one or more inputs.

In another aspect, the present disclosure describes a method. The method can include detecting, by an energy supply station, an arrival of a vehicle at the energy supply station, wherein the energy supply station comprises a mechanical arm and an energy delivery receptacle coupled with the mechanical arm, the energy delivery receptacle configured to deliver energy to vehicles; transmitting, by the energy supply station, an indication of the arrival of the vehicle to a remote computer to enable activation of a virtual interface responsive to detecting the arrival of the vehicle; receiving, by the energy supply station from the remote computer, one or more inputs indicating directions to move the mechanical arm; and moving, by the energy supply station, the mechanical arm according to the one or more inputs.

In at least one aspect, the present disclosure describes an autonomous vehicle. The autonomous vehicle can include an energy input receptacle, one or more sensors, and one or more processors coupled with the one or more sensors. The one or more processors can be configured to automatically control the autonomous vehicle to an energy supply station responsive to determining to resupply energy to the autonomous vehicle; detect, via the sensor, an object corresponding to the energy supply station, the object indicating to initiate energy supply to the autonomous vehicle; responsive to detecting the object, control the autonomous vehicle to stop at a defined position relative to the energy supply station; and open an energy input receptacle of the autonomous vehicle to receive energy from the energy supply station.

In another aspect, the present disclosure describes a method for supplying an autonomous vehicle with energy. The method can include moving the autonomous vehicle to an energy supply station responsive to determining to resupply energy to the autonomous vehicle; detecting an object corresponding to the energy supply station, the object indicating to initiate energy supply to the autonomous vehicle; responsive to detecting the object, stopping the autonomous vehicle at a defined position relative to the energy supply station; and opening an energy input receptacle of the autonomous vehicle to receive energy from the energy supply station.

In at least one aspect, the present disclosure describes an autonomous vehicle. The autonomous vehicle can include first one or more sensors located on a first side of the autonomous vehicle, second one or more sensors located on a second side of the autonomous vehicle, and one or more processors coupled with the first and second one or more sensors. The one or more processors can be configured to automatically control, using images generated by the first one or more sensors, the autonomous vehicle to an energy supply station responsive to determining to resupply energy to the autonomous vehicle; detect, using the images generated by the first one or more sensors, an arrival of the autonomous vehicle at the energy supply station; and responsive to detecting the arrival of the autonomous vehicle at the energy supply station, switch from processing images generated by the first one or more sensors to processing images generated by the second one or more sensors.

In another aspect, the present disclosure describes a method for supplying an autonomous vehicle with energy. The method can include automatically controlling, using images generated by the first one or more sensors, the autonomous vehicle to an energy supply station responsive to determining to resupply energy to the autonomous vehicle; detecting, using the images generated by the first one or more sensors, an arrival of the autonomous vehicle at the energy supply station; and responsive to detecting the arrival of the autonomous vehicle at the energy supply station, switching from processing images generated by the first one or more sensors to processing images generated by the second one or more sensors.

In at least one aspect, the present disclosure describes a system. The system can include a head wearable device, a hand wearable device, and a computer including one or more processors. The one or more processors can be configured to receive, from a vehicle via first one or more sensors of the vehicle, first images or video of a physical environment surrounding the vehicle; receive, from an energy supply station via second one or more sensors of the energy supply station, second images or video of the physical environment surrounding the vehicle; and responsive to receiving the first images or video and the second images or video, generate a virtual interface depicting the physical environment based on the first images or video and the second images or video, the virtual interface enabling a user to provide input to control a mechanical arm of the energy supply station to supply energy to the vehicle.

In another aspect, the present disclosure describes a method for supplying a vehicle with energy. The method can include receiving, by one or more processors from the vehicle via first one or more sensors of the vehicle, first images or video of a physical environment surrounding the vehicle; receiving, by the one or more processors from an energy supply station via second one or more sensors of the energy supply station, second images or video of the physical environment surrounding the vehicle; and responsive to receiving the first images or video and the second images or video, generating, by the one or more processors, a virtual interface depicting the physical environment based on the first images or video and the second images or video, the virtual interface enabling a user to provide input to control a mechanical arm of the energy supply station to supply energy to the vehicle.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 15 shows a calibration environment in which an autonomy system of an automated vehicle performs calibration operations using an array of fixed calibration targets, according to an embodiment.

FIG. 16A is a side view of the calibration environment. FIG. 16B is a top view of the calibration environment.

FIG. 18 shows operations of a method for calibrating sensors of an automated vehicle, according to an embodiment.

DETAILED DESCRIPTION

Figure 1:
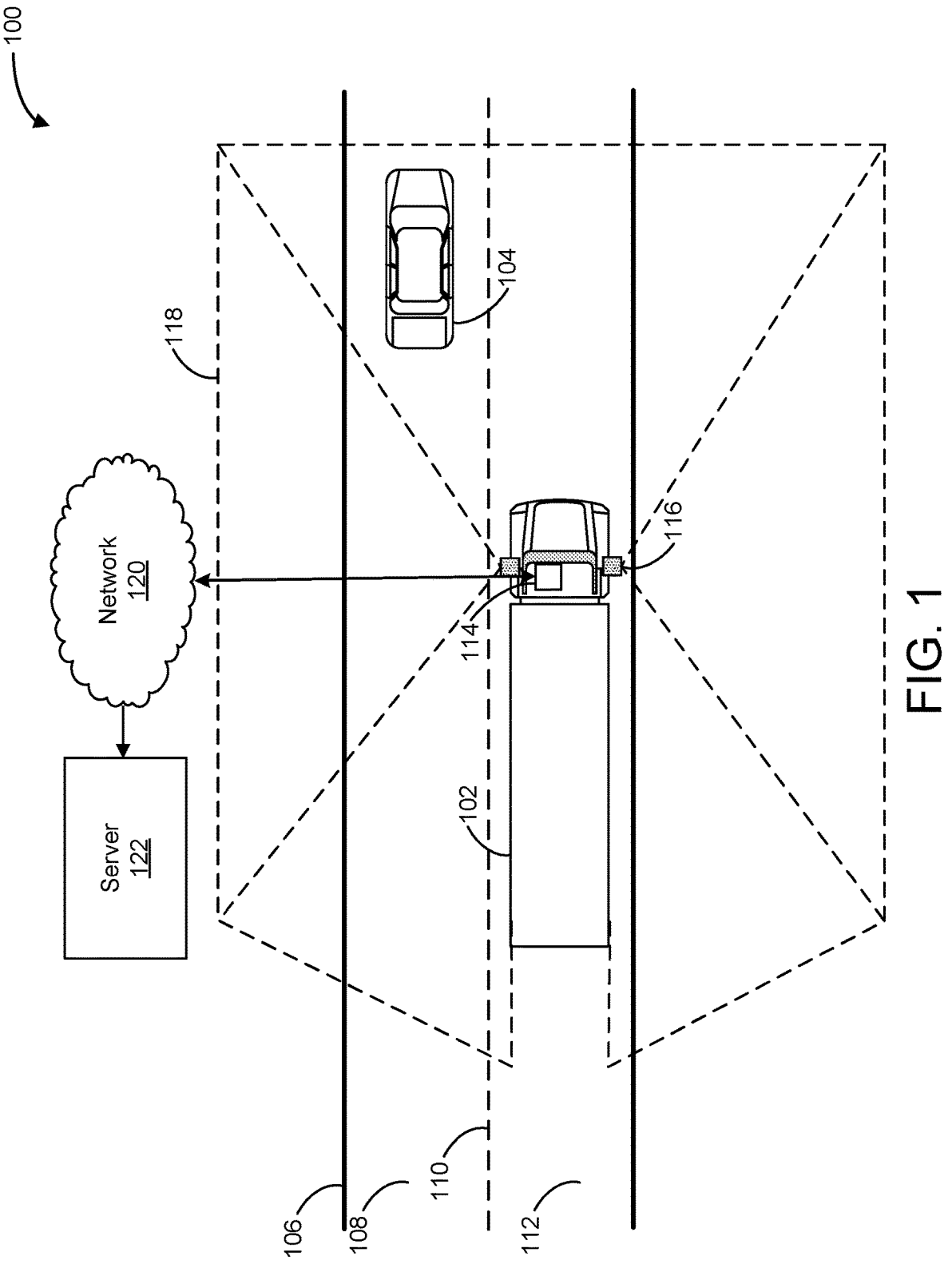
FIG. 1 is a bird's-eye view of a roadway including a schematic representation of a vehicle and aspects of an autonomy system of the vehicle, according to an embodiment.

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Embodiments described herein relate to automated vehicles, such as an automated vehicle having an autonomy system. The autonomy system of an automated vehicle may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to automated vehicles as ego vehicles. The autonomy system may be structured on at least three aspects of technology: (1) perception, (2) maps/localization, and (3) behaviors planning and control. The function of the perception aspect is to sense an environment surrounding the automated vehicle and interpret it. To interpret the surrounding environment, a perception module or engine in the autonomy system of the automated vehicle may identify and classify objects or groups of objects in the environment. For example, a perception module associated with various sensors (e.g., LiDAR, camera, radar, etc.) of the autonomy system may identify one or more objects (e.g., pedestrians, vehicles, debris, etc.) and features of the roadway (e.g., lane lines) around the automated vehicle, and classify the objects in the road distinctly.

The maps/localization aspect of the autonomy system may be configured to determine where on a pre-established digital map the automated vehicle is currently located. One way to do this is to sense the environment surrounding the automated vehicle (e.g., via the perception system) and to correlate features of the sensed environment with details (e.g., digital representations of the features of the sensed environment) on the digital map.

Once the systems on the automated vehicle have determined its location with respect to the digital map features (e.g., location on the roadway, upcoming intersections, road signs, etc.), the automated vehicle can plan and execute maneuvers and/or routes with respect to the features of the digital map. The behaviors, planning, and control aspects of the autonomy system may be configured to make decisions about how the automated vehicle should move through the environment to get to its goal or destination. It may consume information from the perception and maps/localization modules to know where it is relative to the surrounding environment and what other objects and traffic actors are doing.

Embodiments disclosed herein include systems and methods for calibrating perception sensors of an automated vehicle. A perception sensor detects a calibration sensor having one or more reflective surface targets detectable to the type of sensor. A controller or similar processor device of the automated vehicle determines an observer (or predicted) position information for the sensor, the automated vehicle, and/or the calibration target using the sensor's inputs. The controller calibrates the perception sensor based upon comparing the predicted position information gathered by the perception sensor against preconfigured (or expected) position information or geolocation information for the target.

Referring to FIG. 1, the present disclosure relates to autonomous vehicles, such as an autonomous vehicle 102 having an autonomy system 114. The autonomy system 114 of the vehicle 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The present disclosure sometimes refers to autonomous vehicles as ego vehicles. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, energy supply stations, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete the vehicle 102's mission fully autonomously or semi-autonomously.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality. While the perception module 116 is depicted as being located at the front of the vehicle 102, the perception module 116 may be a part of a perception system with various sensors placed at different locations throughout the vehicle 102 (e.g., a front side of the vehicle 102, an energy input side of the vehicle).

Figure 2:
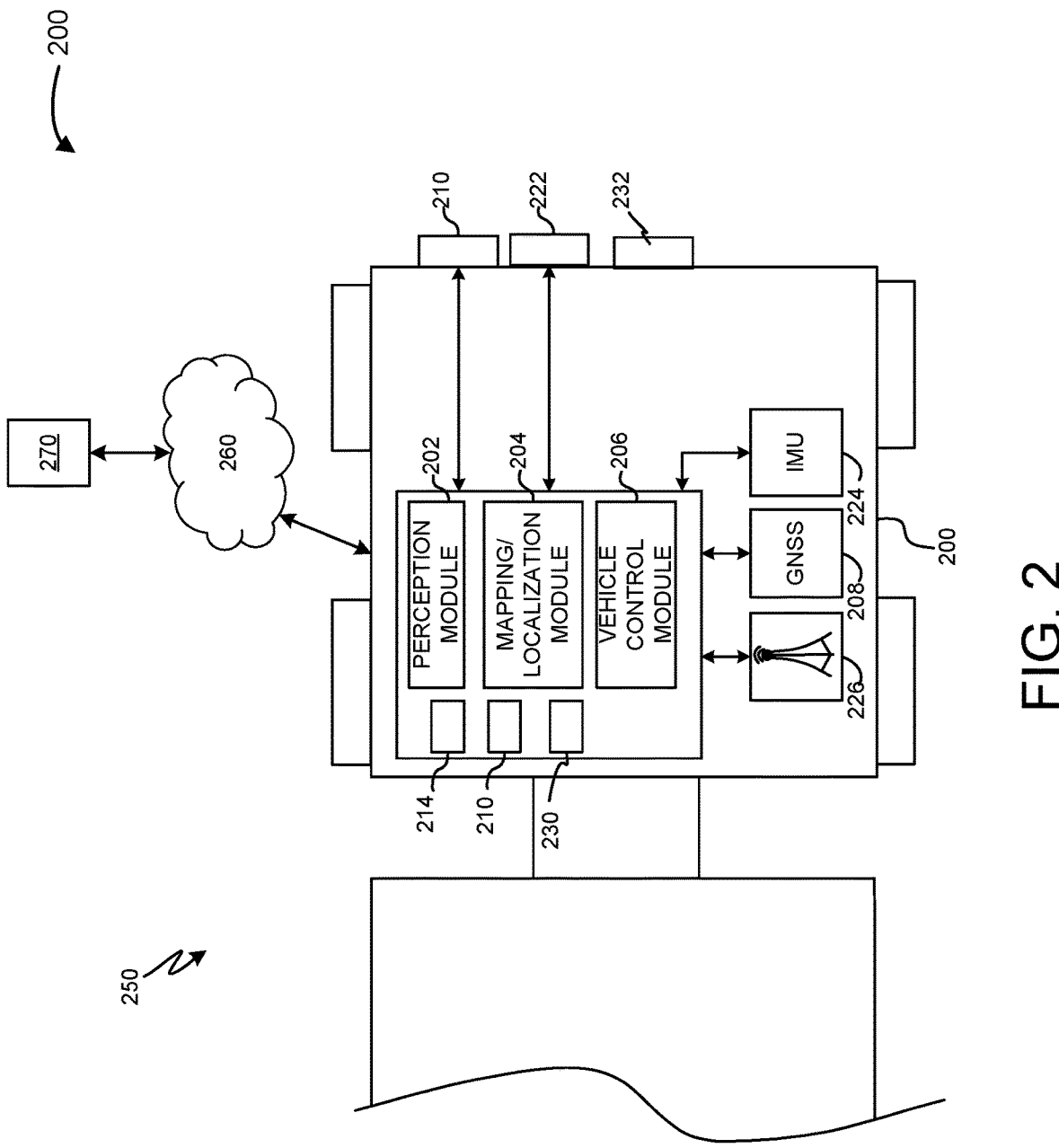
FIG. 2 is a schematic of an autonomy system of a vehicle, according to an embodiment.

FIG. 2 illustrates an example schematic of an autonomy system 250 of a vehicle 200, according to some embodiments. The autonomy system 250 may be the same as or similar to the autonomy system 114. The vehicle 200 may be the same as or similar to the vehicle 102. The autonomy system 250 may include a perception system including a camera system 220, a LiDAR system 222, a radar system 232, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or systems may include more, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. It is to be understood that the perception area 118 is an example area, and the practical area may be greater than or less than what is depicted.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102, at the side of the vehicle 102) or may surround 360 degrees of the vehicle 102. In some embodiments, the image data generated by the camera system(s) 220 may be sent to the perception module 202 and stored, for example, in memory 214.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

In some embodiments, the system inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems."

The GNSS receiver 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the vehicle 200. For example, the IMU 224 may measure a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single microprocessor or multiple microprocessors that may include means for controlling the vehicle 200 to move (e.g., switch lanes) and monitoring and detecting other vehicles. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

The memory 214 of the autonomy system 250 may store data and/or software routines that may assist the autonomy system 250 in performing autonomy system 250's functions, such as the functions of the perception module 202, the mapping/localization module 204, the vehicle control module 206, an energy supply module 230, and the methods 900, 1000, 1200, and 1300 described herein with respect to FIGS. 9, 10, 12, and 13. Further, the memory 214 may also store data received from various inputs associated with the autonomy system 250, such as perception data from the perception system.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image classification function and/or a computer vision function.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other externally-facing sensors and systems on board the vehicle (e.g., the GNSS receiver, etc.). For example, in vehicles having a sonar or radar system, the sonar and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as timeseries data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.)

The mapping/localization module 204 receives perception data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200. The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.) The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

The energy supply module 230 may determine to resupply the vehicle 102 with energy. The energy supply module 230 may detect a supply of energy (e.g., an amount of energy) is below a threshold (e.g., may run out before completing a current route). The energy supply module 230 may communicate with the perception module 202, the mapping/localization module 204, and the vehicle control module 206 to locate an energy supply station (e.g., a location of a next closest energy supply station on the current route), automatically control the vehicle 102 to the energy supply station, and detect an arrival of the vehicle 102 at the energy supply station. To do so, the energy supply module 230 can detect one or more objects corresponding to the energy supply station, indicating arrival of the vehicle 102 at the energy supply station. Responsive to detecting the objects, the energy supply module 230 can determine a defined position to stop the vehicle 102 (e.g., next to the energy supply station) based on the detected objects. For example, the energy supply module 230 may perform image recognition techniques to identify the object or the energy supply module 230 may transmit data (e.g., image, video, or other identifying data) regarding the object to the remote server 270 and receive an indication that the remote server 270 detected the object. The energy supply module 230 can open an energy input receptacle of the vehicle 102. The energy supply module 230 can open the energy input receptacle of the vehicle 102 responsive to detecting the arrival of the vehicle 102 at the energy supply station.

Additionally, responsive to detecting the arrival of the vehicle 102 at the energy supply station, the vehicle 102 can switch processing first image or video data to processing second image or video data. For example, the energy supply module 230 may communicate with the perception module 202 that the vehicle 102 has arrived at the energy supply station. In some cases, the energy supply module 230 may send an indication of arrival responsive to detecting the object. The perception module 202 may switch processing the first image or video data of a first set of sensors (e.g., front facing sensors) to processing the second image or video data of a second set of sensors (e.g., lateral facing sensors, sensors associated with the energy input receptacle of the vehicle 102). By doing so, for example, the perception module 202 can reduce processing resources required for autonomous control and only use process data that captures relative aspects of the environment (e.g., the area in which the energy supply station may fuel the vehicle 102.

The energy supply module 230 can transmit one or more signals to the remote server 270 of the surrounding environment. For example, the energy supply module 230 may obtain image or video data of the surrounding environment from the perception module 202. The image or video data may depict the surrounding environment (e.g., a physical area surrounding the vehicle 102 and including the energy supply station) from multiple angles. The energy supply module 230 may transmit the signals including the image or video data to the remote server 270. The remote server 270 can generate a virtual interface to enable the energy supply station to supply energy to the vehicle 102 based on the transmitted signals. To do so, for example, the remote server 270 can process the image or video data received from the vehicle 102. By processing the data depicting multiple angles of the surrounding environment, the remote server 270 can create a virtual depiction of the physical environment (e.g., a live feed of the physical environment). In some cases, the remote server 270 may receive (e.g., from the energy supply station) and process second image or video data of the surrounding environment for generating the virtual interface (e.g., use the second image or video data in combination with the image or video data from the vehicle 102 to generate the virtual interface).

Figure 3:
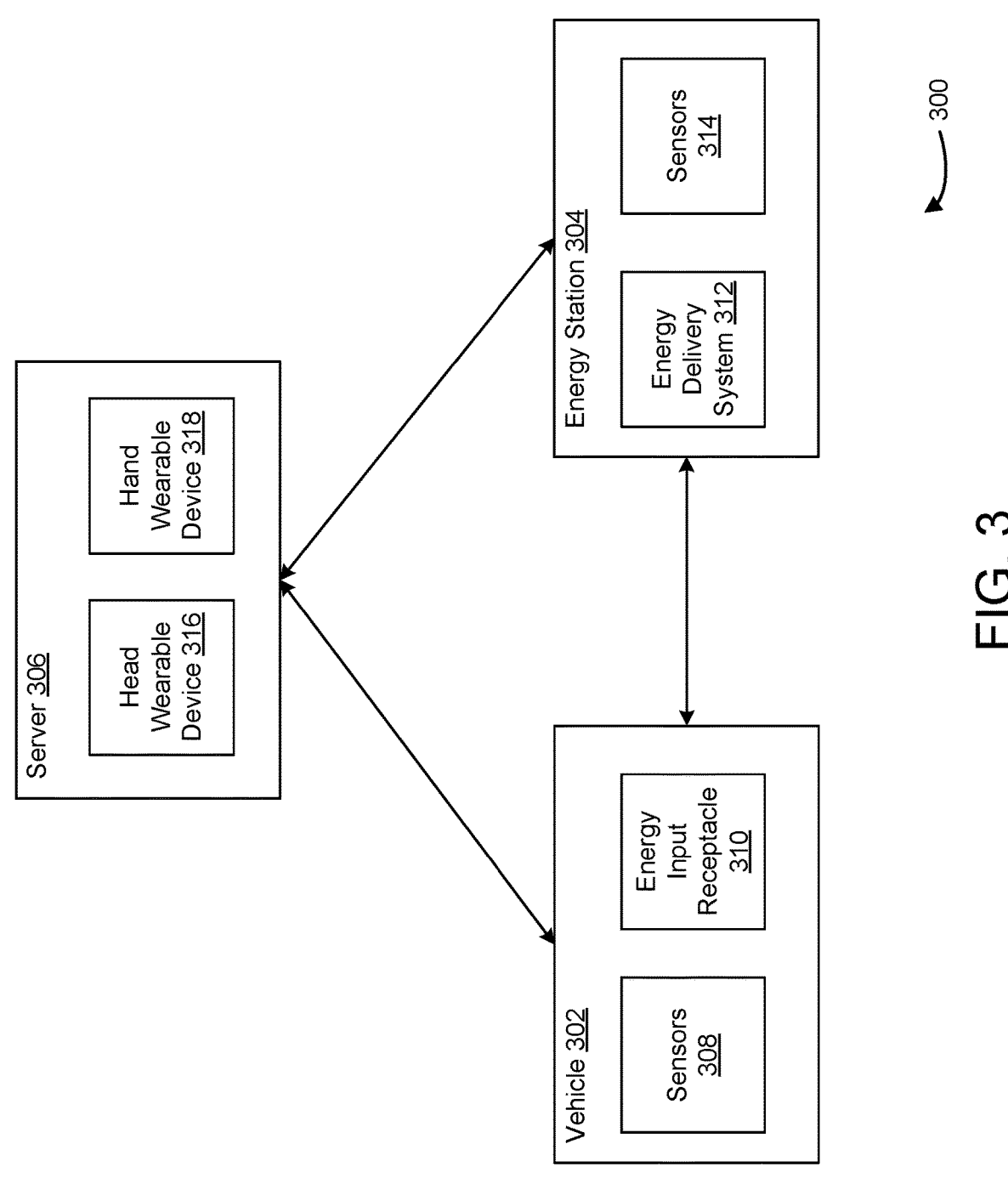
FIG. 3 is a system that supports supplying energy to an autonomous vehicle via a virtual interface, according to an embodiment.

The remote server 270 can send the generated virtual interface to a head wearable device, as explained herein with reference to FIG. 3. For example, an operator may use the head wearable device to interact with (e.g., see a visual representation of) the surrounding environment of the vehicle 102. The operator may use a hand wearable device to provide inputs (e.g., increments in the x, y, z, pitch, roll, or yaw direction) for the remote server 270 to transmit to the energy supply station. The energy supply station (e.g., a processor of the energy supply station) can receive the inputs and manipulate (e.g., activate, move, use) a mechanical arm of the energy supply station according to the inputs. The operator may manipulate the mechanical arm in this manner (e.g., using the virtual interface to interact with the energy supply station and the vehicle 102) to supply energy to the vehicle 102 via remote access to the energy supply station.

FIG. 3 is a system 300 that supports supplying energy to an autonomous vehicle via a virtual interface, according to an embodiment. The system 300 can include an autonomous vehicle 302, an energy supply station 304, and a server 306. The autonomous vehicle 302 can include one or more sensors 308 and an energy input receptacle 310. The vehicle 302 can be the same as or similar to the vehicle 102. The energy supply station 304 can include an energy delivery system 312 and one or more sensors 314. The server 306 can include a head wearable device 316 and a hand wearable device 318. The server 306 can be the same as or similar to the remote server 122 or 270. The vehicle 302, the energy supply station 304, and the server 306 can communicate via a network. For example, the vehicle 302 and the energy supply station 304 can collect data regarding a physical environment (e.g., a physical area). The vehicle 302 and the energy supply station 304 can transmit the collected data to the server 306. The server 306 can process the received data and generate a virtual interface of the physical environment. The virtual interface can include virtual representations of the energy delivery system 312 and the energy input receptacle 310.

In some cases, the autonomous vehicle 302 may determine to refuel. For example, the autonomous vehicle 302 may monitor an energy level (e.g., a meter) of the autonomous vehicle 302. The autonomous vehicle 302 may detect that the energy level is below a threshold or is insufficient to reach a destination along a current route. The autonomous vehicle 302 may determine to automatically drive towards the energy supply station 304. For example, the autonomous vehicle 302 may determine locations of various energy supply stations on one or more digital maps stored locally on the autonomous vehicle 302 or the autonomous vehicle 302 may transmit a query to the server 306 (or another remote server) to receive an indication of the locations. The autonomous vehicle 302 may determine which of the energy supply stations are located along or close to the current route. The autonomous vehicle 302 may adjust a course or direction of the autonomous vehicle 302 to begin moving towards the location of the energy supply station 304.

In some examples, the autonomous vehicle 302 may detect an arrival at the energy supply station 304. For example, the autonomous vehicle 302 may detect on the digital maps a current location associated with the autonomous vehicle 302 is next to or at the location of the energy supply station 304. The autonomous vehicle 302 may detect one or more objects associated with the energy supply station 304 to determine arrival at the energy supply station 304. The autonomous vehicle 302 may detect the objects via the sensors 308. For example, the autonomous vehicle 302 may obtain image or video data indicating the objects. The objects may be any of predefined shapes, figures, articles, and the like that indicate a location of the energy supply station 304 and a predefined position to stop the autonomous vehicle 302 for energy supply, as described herein with reference to FIGS. 8A-B. The autonomous vehicle 302 may be configured to identify the objects based on the obtained image or video data, or the autonomous vehicle 302 may communicate the image or video data to the server 306 (or another remote server) to receive an indication that the image or video data is associated with the objects.

In some embodiments, the autonomous vehicle 302 may detect the objects via a first set of sensors 308. For example, the autonomous vehicle 302 may include a first set of sensors 308 and a second set of sensors 308. The first set of sensors 308 may be located at a front side (e.g., an anterior side) of the autonomous vehicle 302 and the second set of sensors 308 may be located at a lateral side of the autonomous vehicle 302 (e.g., a lateral side associated with the energy input receptacle 310 or the side on which the energy input receptacle 310 is located), as described herein with reference to FIGS. 8A-B. In some cases, the autonomous vehicle 302 may process data (e.g., image or video data) from the first set of sensors 308 during normal operation (e.g., while en route to a destination). The autonomous vehicle 302 may process data (e.g., image or video data) from the second set of sensors 308 during an energy supply procedure. For example, responsive to detecting the objects via the first set of sensors 308, the autonomous vehicle 302 may stop processing data from the first set of sensors 308 and begin processing data from the second set of sensors 308. The second set of sensors 308 may be located next to or may be a part of the energy input receptacle 310 (e.g., to depict a live feed for a virtual interface).

Responsive to detecting the objects, the autonomous vehicle 302 may stop. For example, the autonomous vehicle 302 may stop at a predefined location in relation to the energy supply station 304, the objects, or both, as described herein with reference to FIGS. 8A-B. The autonomous vehicle 302 may open (e.g., unlock, uncover) the energy input receptacle 310 responsive to detecting the arrival at the energy supply station 304. The autonomous vehicle 302 may switch processing data from the first set of sensors 308 to the second set of sensors 308. The autonomous vehicle 302 may transmit one or more signals to the server 306. In some cases, the one or more signals include data from the first set of sensors 308, the second set of sensors 308, or both. The data may include image or video data of the surrounding environment. For example, the data may depict a physical area surrounding the autonomous vehicle 302 and including the energy supply station 304, the energy input receptacle 310, and other objects in the FOV of the autonomous vehicle 302.

In some cases, the energy supply station 304 (e.g., via a processor of the energy supply station 304) may detect the arrival of the autonomous vehicle 302. For example, the autonomous vehicle 302 may transmit an indication of arrival to the energy supply station 304. The energy supply station 304 may detect the arrival of the autonomous vehicle 302 via the sensors 314 or another sensor (e.g., a pressure sensor in the road, and the like). The energy supply station 304 may determine the autonomous vehicle 302 to be self-driving (i.e., at least partially autonomous, such as levels 2, 3, 4, or 5). For example, the energy supply station 304 may be configured to support both manually operated vehicles and autonomous vehicles. The energy supply station 304 may refrain from initiating an autonomous vehicle fueling process if the energy supply station 304 detects a manually operated vehicle. In some cases, the autonomous vehicle 302 may determine the autonomous vehicle 302 to be an autonomous vehicle based on receiving a signal from the autonomous vehicle 302, detecting the lack of a physical operator of the autonomous vehicle 302, or detecting another type of identifier associated with autonomous vehicles (e.g., a license plate and the like).

Responsive to detecting the autonomous vehicle 302, the energy supply station 304 may begin the automatic fueling process. To do so, the energy supply station 304 may transmit an indication to the server 306 of the arrival of the autonomous vehicle 302. The server 306 may receive the indication and notify an operator of the arrival of the autonomous vehicle 302. The energy supply station 304 may obtain image and video data of the surrounding environment via the sensors 314. For example, the image and video data may include indications of the autonomous vehicle 302, the energy input receptacle 310, the energy delivery system 312 (including a mechanical arm of the energy supply station 304 and an energy delivery receptacle of the energy supply station 304), and other objects in the surrounding area. The energy supply station 304 may transmit a signal including the image and video data to the server 306.

In some cases, the server 306 may generate a virtual interface of the area surrounding the autonomous vehicle 302 and the energy supply station 304. For example, the server 306 may receive first image or video data from the autonomous vehicle 302 and second image or video data from the energy supply station 304. The first image or video data and the second image or video data may include data covering multiple FOVs. For example, the combined data may provide a live feed of the physical environment between the autonomous vehicle 302 and the energy supply station 304 (e.g., a 360° view). The server 306 may process the first and second image or video data to generate the virtual interface. In some examples, the server 306 may generate the virtual interface using virtual reality technology. The server 306 may send the virtual interface to the head wearable device 316. For example, an operator may use the head wearable device 316 and the hand wearable device 318 to remotely interact with the autonomous vehicle 302 and the energy station 304. For example, the head wearable device 316 may project the virtual interface to the operator. The head wearable device 316 may project the virtual interface onto a display from the point of view of the energy supply station 304 (e.g., as if the operator were looking from the energy station 304 and holding the energy delivery receptacle). The hand wearable device 318 may be used to send movement commands to the energy supply station 304. For example, the hand wearable device 318 may detect movements from the operator (e.g., hand gestures, finger movements, and the like). The hand wearable device 318 may send the movements (e.g., inputs) to the server 306. The server 306 may process the movements and generate a list (e.g., set) of commands based on the movements. In some embodiments, the server 306 may generate the commands to be in a format according to a type (e.g., computer readable commands, commands configured to be identified by a mechanical arm). The server 306 may transmit a signal including the list of commands to the energy station 304 to enable the operator to move a mechanical arm of the energy supply station 304.

The energy supply station 304 may receive the list of commands. The energy supply station 304 may process the list of commands. In some embodiments, the energy supply station 304 may convert the list of commands to be of the type (e.g., identifiable by the mechanical arm). The energy supply station 304 may send the list of commands to the mechanical arm of the energy delivery system 312. The energy delivery system 312 may move the mechanical arm in accordance with the commands. In some cases, the commands may cause the mechanical arm to grab (e.g., grasp, physically couple with) the energy delivery receptacle of the energy delivery system 312 (not depicted), as described with reference to FIG. 11. The commands may cause the mechanical arm to move the energy delivery receptacle to connect or couple with (e.g., physically make contact with, enter into) the energy input receptacle 310 of the vehicle 302.

The energy supply station 304 may detect that the energy delivery receptacle is connected or coupled with the energy input receptacle 310. For example, the energy delivery receptacle may include a sensor (e.g., a pressure sensor, an image or video capturing device) to detect that the energy delivery receptacle is connected or coupled with the energy input receptacle 310. The energy supply station 304 may receive an indication from the server 306 that the energy delivery receptacle is connected or coupled with the energy input receptacle (e.g., the operator indicates they are coupled). In some cases, the energy supply station 304 may receive an indication from the server 306 to start supplying energy to the autonomous vehicle 302. For example, the hand wearable device 318 may detect an indication from the operator to begin supplying energy. The operator may close their hand (wearing the hand wearable device) as if pulling up on a trigger (e.g., handle) of a virtual representation of the energy delivery receptacle (e.g., from the point of view of the operator via the virtual interface), as is described herein with reference to FIG. 11. The server 306 may transmit a signal including the indication, a list of commands to cause the mechanical arm to close (e.g., apply pressure to) a physical trigger of the energy delivery receptacle, or both. The energy station 304 may initiate supplying energy to the autonomous vehicle 302 based on the signal. In some cases, the energy may be petrol, diesel, electricity, natural gas, or another type of energy to enable the autonomous vehicle 302 to move.

The energy supply station 304 may determine to stop supplying energy to the autonomous vehicle 302. For example, the hand wearable device 318 may detect one or more movements (e.g., open their hand, virtually release grip on the trigger) from the operator indicating to stop supplying the energy. The server 306 may transmit a signal indicating to the energy supply station 304 to stop supplying the energy and put away the energy delivery receptacle (e.g., move the energy delivery receptacle via the mechanical arm to an initial position). The energy supply station 304 may stop supplying the energy and return to an initial state (e.g., a waiting state for the next vehicle to arrive).

The autonomous vehicle 302 may detect a reception of the energy. For example, the autonomous vehicle 302 may monitor the meter and determine that an energy level of an energy container (e.g., a fuel tank, one or more batteries) of the autonomous vehicle 302 satisfies a threshold (e.g., is full, is sufficient to complete the current route). The autonomous vehicle 302 may determine that the energy supply station 304 has finished supplying the energy to the autonomous vehicle 302 (e.g., via the sensors 308, via a signal from the server 306 indicating the energy has been supplied). The autonomous vehicle 302 may close (e.g., cover, lock) the energy input receptacle 310. The autonomous vehicle 302 may switch processing data from the second set of sensors 308 to the first set of sensors 308. The autonomous vehicle 302 may move away from the energy station 304 and continue the current route.

Figure 4:
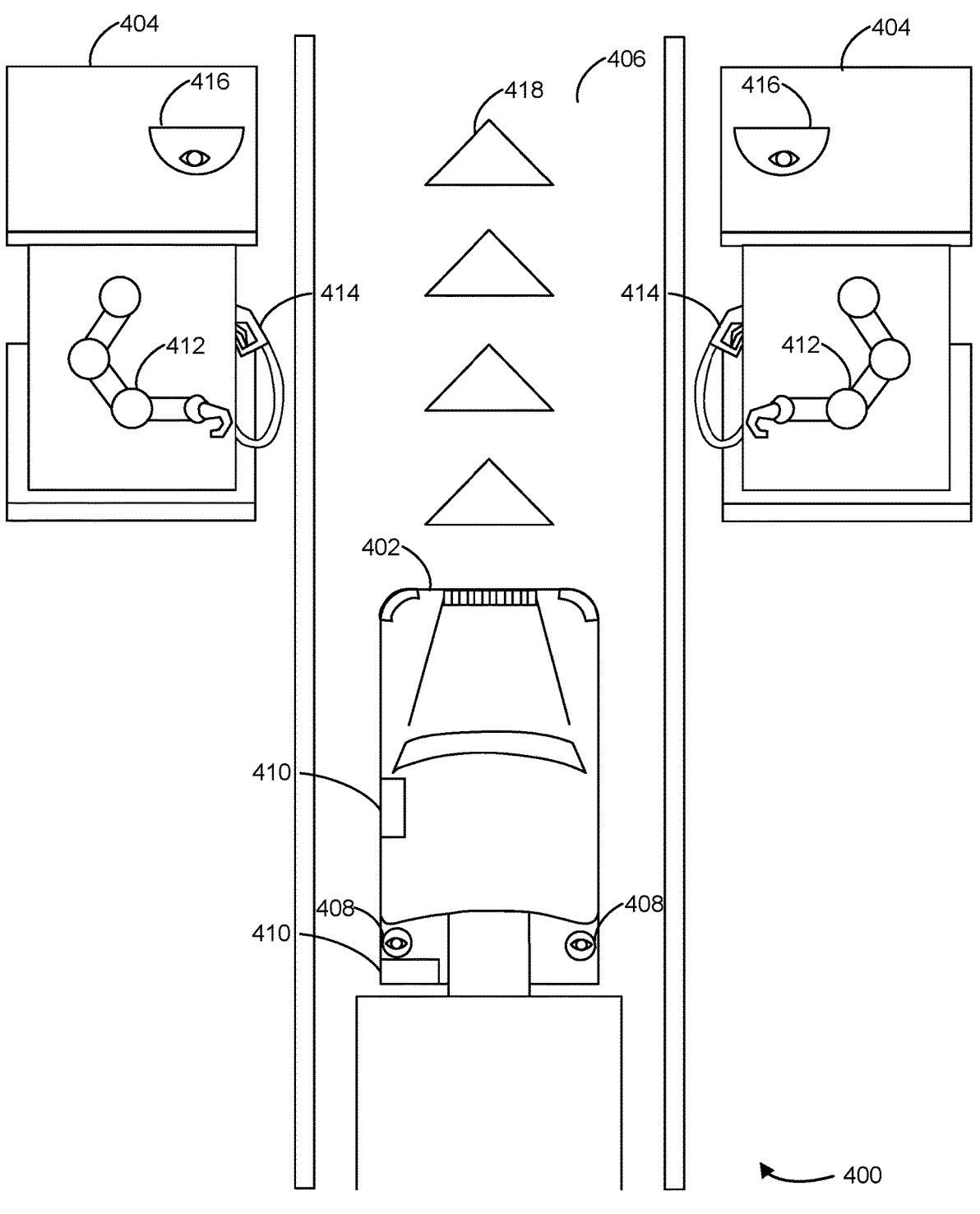
FIG. 4 is a bird's-eye view of a roadway that supports supplying energy to an autonomous vehicle via a virtual interface, according to an embodiment.

FIG. 4 is a bird's-eye view of a roadway that supports supplying energy to an autonomous vehicle via a virtual interface, according to an embodiment. FIG. 4 illustrates an environment 400 that includes a vehicle 402, one or more energy supply stations 404, and a roadway 406. The vehicle 402 can include one or more sensors 408 and an energy input receptacle 410. The vehicle 402 can be the same as or similar to the vehicles 102 and 302. The energy supply stations 404 can include one or more sensors 416, a mechanical arm 412, and an energy delivery receptacle 414. The energy supply station 1104 can be the same as or similar to the energy supply station 304. The roadway 406 can include one or more objects 418 associated with the energy supply stations 404.

In some cases, the vehicle 402 may approach the energy supply station 404. The vehicle 402 may detect one or more objects 418 (e.g., physical objects or paintings of a shape, such as a defined shape). For example, the vehicle 402 may process image or video data collected from the sensors 408 (e.g., image or video capturing devices). The image or video data may include depictions of the objects 418. In some cases, the vehicle 402 may process the image or video data and determine the objects 418 are associated with the energy supply station 404. In some cases, the vehicle 402 may process the image or video data and transmit a signal including the processed data to a remote server (e.g., a cloud server). The remote server may determine the objects 418 are associated with the energy supply station and transmit an indication of arrival of the vehicle 402 at the energy supply station 404. In some examples, the objects 418 may be on the roadway 406. Alternatively, the objects 418 may be on another surface adjacent to the energy supply station 404. While illustrated in FIG. 4 to be a type of shape (e.g., multiple triangles), the objects 418 may be any type of shape, feature, figures, or other identifying object to indicate to the vehicle 402 arrival at the energy supply station 404 and a predefined location to stop the vehicle 402 for an energy supply procedure.

In some examples, the vehicle 402 may stop at the predefined location. The vehicle 402 may determine the objects 418 match a predefined object indicating arrival at the energy supply station 404. The objects may indicate the predefined location. For example, the predefined location may be a physical area between a first one of the objects 418 and a second one of the objects 418 (e.g., between the first and last object 418, between the last and penultimate object 418 when approached from an entrance to the energy supply station 404). The predefined location may be in relation to the objects in multiple manners (e.g., may be parallel to the objects 418, a predefined distance from the objects 418, and the like).

In some cases, the energy supply station 404 may determine the arrival of the vehicle 402 at the energy supply station 404. The energy supply station 404 may detect, via the sensors 416, the arrival. In some cases, multiple energy supply stations 404 may be proximate to the roadway 406. For example, the energy input receptacle 410 of the vehicle 402 may be on a first lateral side (e.g., left side as illustrated in FIG. 4) or a second lateral side (e.g., right side) of the vehicle 402. The energy supply stations 404 may detect, via the sensors 416, which side the energy input receptacle 410 is on. For example, the energy supply stations 404 may detect an identifier (e.g., a type of the vehicle 402, a brand of the vehicle 402, a model of the vehicle 402, an object on the vehicle 402, the energy input receptacle 410 on the vehicle 402) that indicates which side the energy input receptacle 410 is on. A first energy supply station 404 on the first lateral side of the roadway 406 may determine the energy input receptacle 410 is located on the first lateral side of the vehicle 402. The first energy supply station 404 may initiate the energy supply procedure.

Figure 5:
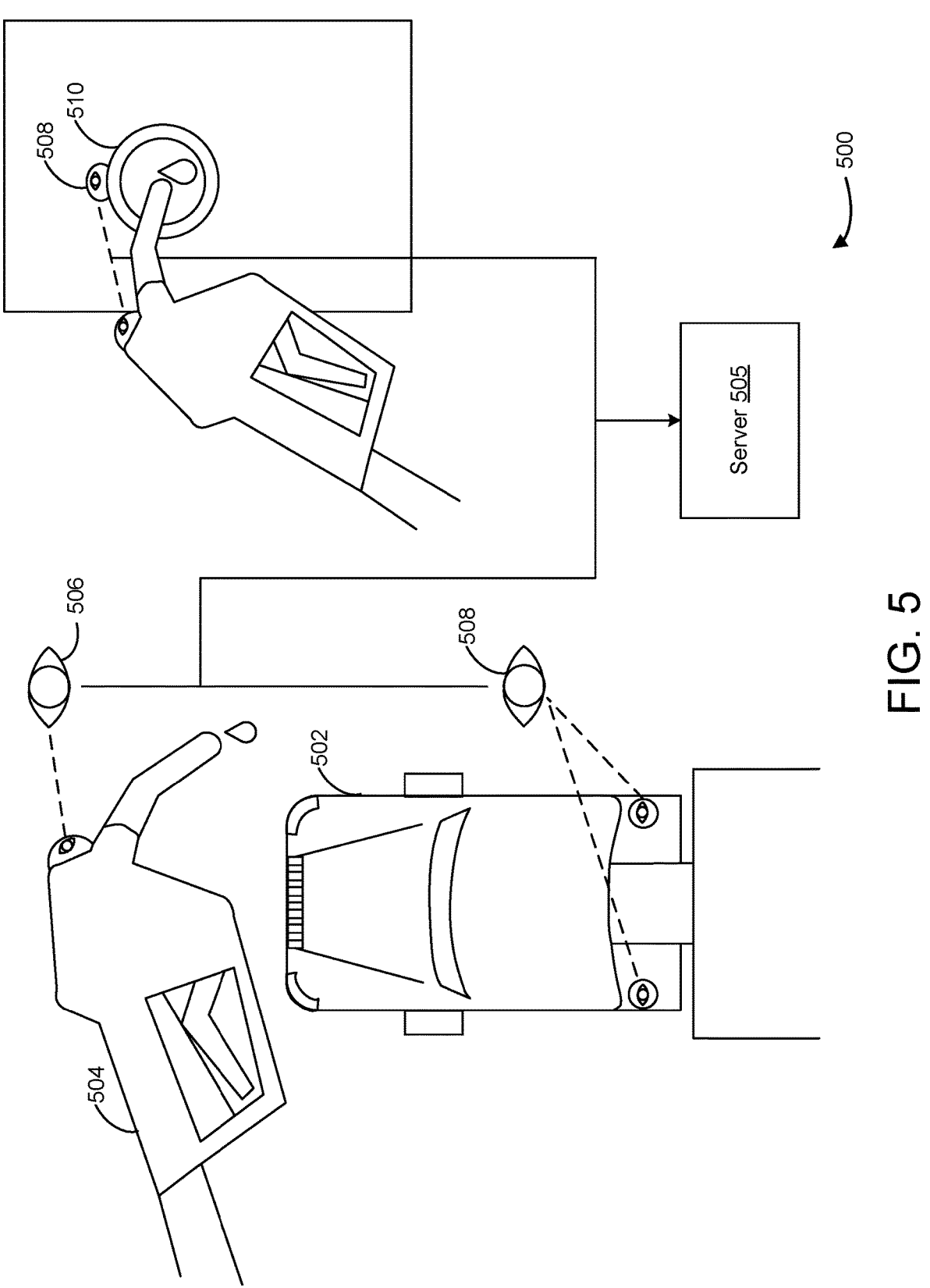
FIG. 5 is an illustration of wireless communication that supports supplying energy to an autonomous vehicle via a virtual interface, according to an embodiment.

FIG. 5 is an illustration of a wireless communications system 500 that supports supplying energy to an autonomous vehicle via a virtual interface, according to an embodiment. The system 500 can include a vehicle 502, an energy delivery receptacle 504, and a server 505. The vehicle 502 can include one or more sensors 508 and an energy input receptacle 510. The vehicle 502 can be the same as or similar to the vehicles 102 and 302. The energy delivery receptacle 504 of an energy supply station (not depicted), as described with reference to FIG. 3, can include one or more sensors 506. The server 505 can be the same as or similar to the remote servers 122, 270, or 306.

The vehicle 502, the energy supply station, and the server 505 can communicate via a network. For example, the vehicle 502 and the energy supply station can collect data regarding a physical environment (e.g., a physical area). For example, the vehicle 502 and the energy supply station may include multiple sensors 508 and 506, respectively. In some cases, at least some of the sensors 506 of the energy supply station may be located on the energy delivery receptacle 504. At least some of the sensors 508 of the vehicle 502 may be located proximal to (e.g., on) the energy input receptacle 510. The sensors 506 and 508 may obtain image or video data of the area between the energy supply station and the vehicle 502. The sensors 506 and 508 may send the data to the energy supply station and the vehicle 502, respectively. The energy supply station and the vehicle 502 may transmit the data to the server 505 via the network. The server 505 can process the received data and generate a virtual interface of the physical environment. The virtual interface can include virtual representations of the energy delivery receptacle 504 and the energy input receptacle 510.

Figure 6:
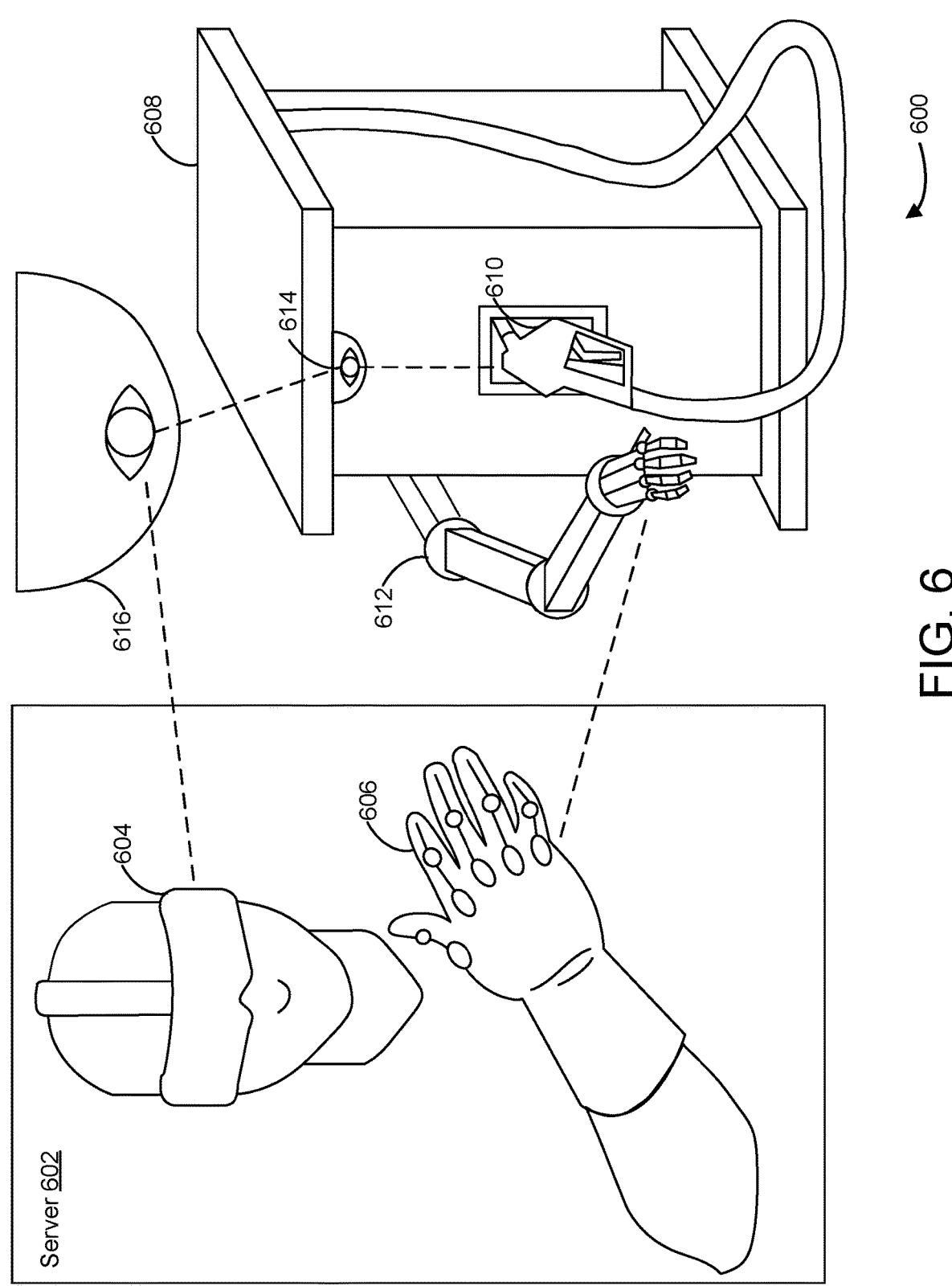
FIG. 6 is an illustration of system that supports supplying energy to an autonomous vehicle via a virtual interface, according to an embodiment.

FIG. 6 is an illustration of a system 600 that supports supplying energy to an autonomous vehicle via a virtual interface, according to an embodiment. The system 600 can include a server 602 and an energy supply station 608. The server 602 can include a head wearable device 604 and a hand wearable device 606. The server 602 can be the same as or similar to the remote servers 122, 270, or 306. The energy supply station 608 can include one or more sensors 614, a mechanical arm 612, and an energy delivery receptacle 610. The energy supply station 608 can be the same as or similar to the energy supply station 304. The energy supply station 608 and the server 602 can communicate via a network. For example, the energy supply station 608 and a vehicle (not depicted) can collect data regarding a physical environment (e.g., a physical area). The energy supply station 608 and the vehicle can transmit the collected data to the server 602.

In some cases, the server 602 can process the received data and generate a virtual interface 616 of the physical environment. For example, the data may be image or video data collected from multiple sensors 614 and other sensors (e.g., of the vehicle). The data may be of the physical environment between the vehicle and the energy supply station 608 from multiple points of view. The server 602 may depict the virtual interface 616 to an operator via the head wearable device 604. For example, the head wearable device 604 may show the operator a virtual reality image (e.g., a three-dimensional (3D) image) from the point of view of the energy supply station (e.g., the point of view of the sensor 614).

In some cases, the virtual interface 616 may depict (e.g., provide a virtual representation of) the mechanical arm 612, the energy delivery receptacle 610, and the vehicle. The virtual interface 616 may show the operator the mechanical arm (e.g., as if the operator was looking down at a virtual representation of their own arm). The hand wearable device 606 (e.g., worn on a hand of the operator) may detect (e.g., sense, determine) movements made by the operator (e.g., hand movements, finger movements, arm movements, and the like). The hand wearable device 606 may convert the movements (e.g., inputs) into computer readable instructions for the server 602 and/or the energy supply station 608. The server 602 may transmit the computer readable instructions to the energy supply station 608 to command the mechanical arm 612 to move accordingly. For example, the operator may move the mechanical arm 612 to grab the energy delivery receptacle, move the energy delivery receptacle 610 to connect or couple with an energy input receptacle of the vehicle, and squeeze (e.g., pull together, press, push, etc.) a lever of the energy delivery receptacle 610 to initiate supplying energy to the vehicle.

In some cases, the energy delivery receptacle 610 may be a different energy delivery receptacle 610 than illustrated by FIG. 6. For example, the energy delivery receptacle 610 may include another energy initiating mechanism (e.g., a button rather than a lever), a different type of handle (e.g., a handle configured to couple with the mechanical arm 612), or any other configuration that will enable the mechanical arm 612 to couple with (e.g., grab) the energy delivery receptacle 610 and move the energy delivery receptacle 610 to connect or couple with the energy input receptacle of the vehicle.

Figure 7:
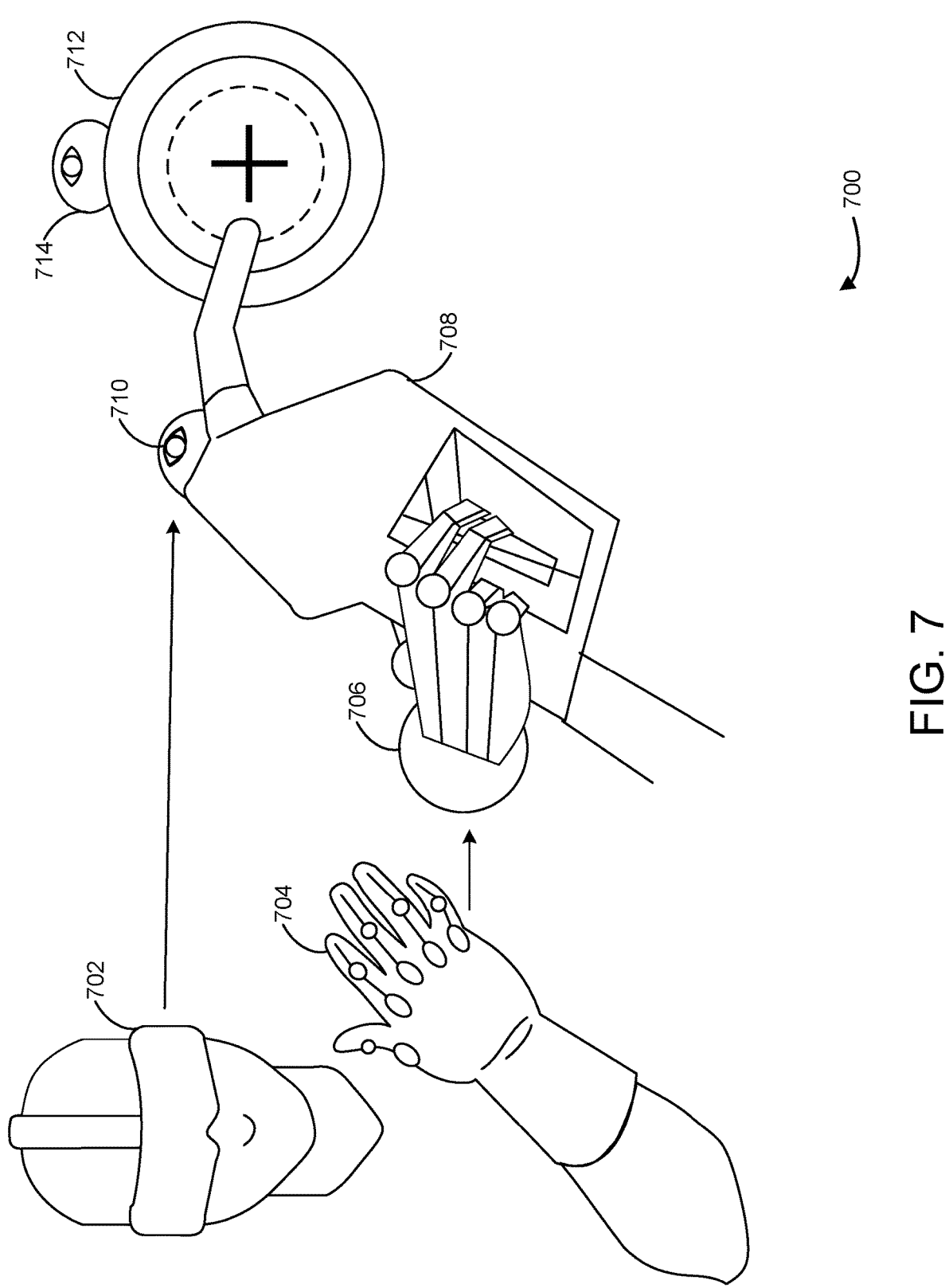
FIG. 7 is an illustration of wireless communication that supports supplying energy to an autonomous vehicle via a virtual interface, according to an embodiment.

FIG. 7 is an illustration of a wireless communications system 700 that supports supplying energy to an autonomous vehicle via a virtual interface, according to an embodiment. The system 700 can include a head wearable device 702, a hand wearable device 704, a mechanical arm 706, an energy delivery receptacle 708, and an energy input receptacle 712. The energy delivery receptacle 708 can include one or more sensors 710 and the energy input receptacle 712 can include one or more sensors 714. In some cases, the energy delivery receptacle 708 is part of an energy supply station, the energy supply station (not depicted) the same as or similar to the energy supply station 304. In some cases, the energy input receptacle 712 is part of an autonomous vehicle, the autonomous vehicle (not depicted) the same as or similar to the vehicles 102 and 302. In some cases, the head wearable device 702 and the hand wearable device 704 are part of a server, the server (not depicted) the same as or similar to the remote servers 122, 270, or 306.

In some cases, the server may generate a virtual interface. For example, the sensors 710 and 714 may obtain image or video data. The vehicle and the energy delivery receptacle may transmit respective image or video data to the server. The image or video data may depict a physical environment from multiple points of view. The server may process the respective image or video data and generate the virtual interface based on the processed data.

An operator may interact with the virtual interface via the head wearable device 702 and the hand wearable device 704. For example, the operator may wear the hand wearable device 704 on a hand of the operator and may wear the head wearable device 702 over eyes of the operator. The head wearable device 702 may show (e.g., depict, project) a 3D image of the physical environment to the operator. The hand wearable device 702 may enable the operator to control the mechanical arm 706. For example, the 3D image may include virtual representations of the mechanical arm 706, the energy delivery receptacle 708, and the energy input receptacle 712. The hand wearable device 702 may receive inputs from the operator (e.g., detect hand movements by the operator) to move (e.g., manipulate) the mechanical arm.

In some examples, the virtual interface may switch points of view. For example, the head wearable device 702 may initially depict the 3D image from the point of view of the energy supply station (e.g., with the mechanical arm 706 relationally distal or below the point of view of the virtual interface, as if the mechanical arm 706 is at a similar position as the arm of the operator to the head of the operator). Responsive to the mechanical arm 706 coupling with (e.g., grabbing) the energy delivery receptacle 708, the head wearable device 702 may depict the virtual interface (e.g., the 3D image) from a second point of view of the energy delivery receptacle 708 (e.g., from the point of view of the sensor 710 on the energy delivery receptacle 708). By switching to the second point of view, the operator may more accurately move the energy delivery receptacle 708 to connect or couple with (e.g., be inserted in) the energy input receptacle 712.

Figure 8:
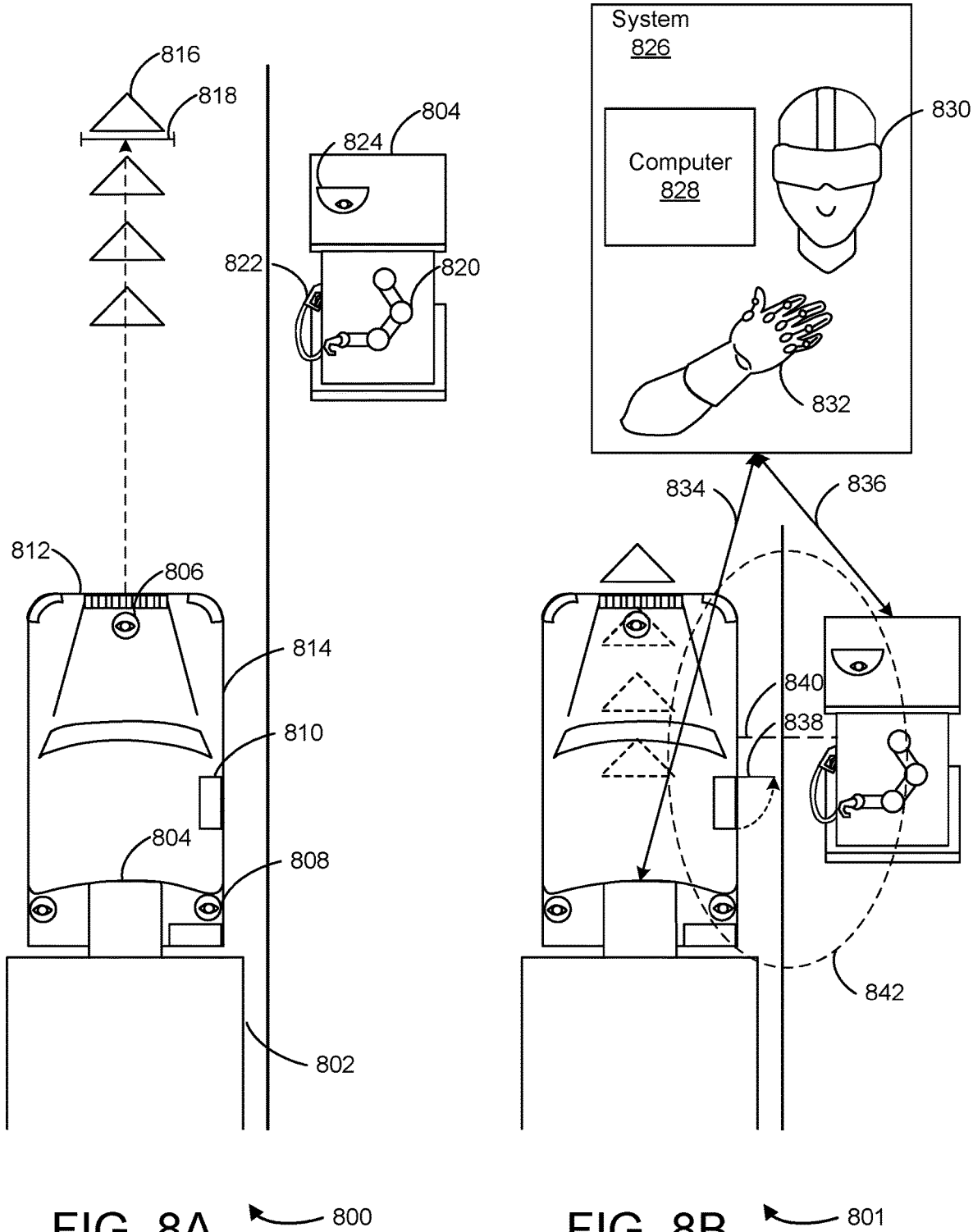
FIGS. 8A-B are bird's-eye views of roadways that support supplying energy to an autonomous vehicle via a virtual interface, according to an embodiment.

FIGS. 8A-B are bird's-eye views of roadways that support supplying energy to autonomous vehicles via a virtual interface, according to an embodiment. FIGS. 8A-B illustrates an environment 800 and 801 that includes a vehicle 802, an energy supply station 804, and a system 826. The vehicle 802 can include first one or more sensors 806, second one or more sensors 808, an energy input receptacle 810, a front side 812, and a lateral side 814. The vehicle 802 can be the same as or similar to the vehicle 102. The system 826 can include a computer 828, a head wearable device 830, and a hand wearable device 832. The computer 828 can be the same as or similar to the remote server 122 or 270. The energy supply station 804 can include one or more sensors 824, a mechanical arm 820, and an energy delivery receptacle 822. The energy supply station 804 can be the same as or similar to the energy supply station 304. The vehicle 802, the energy supply station 804, and the system 826 can communicate via a network. For example, the vehicle 802 and the energy supply station 804 can collect data regarding a physical environment 842 (e.g., a physical area). The vehicle 802 and the energy supply station 804 can transmit the collected data to the system 826. The system 826 can process the received data and generate a virtual interface, as described herein with reference to FIG. 11.

In some embodiments, the vehicle 802 may determine to fuel (e.g., refuel). For example, the vehicle 802 may monitor an energy level (e.g., a meter) of the vehicle 802. The vehicle 802 may detect that the energy level is below a threshold or is insufficient to reach a destination along a current route. The vehicle 802 may determine to automatically drive towards the energy supply station 804. For example, the vehicle 802 may determine locations of various energy supply stations on one or more digital maps stored locally on the vehicle 802 or the vehicle 802 may transmit a query to the system 826 (or another remote server) to receive an indication of the locations. The vehicle 802 may determine which of the energy supply stations are located along or close to the current route. The vehicle 802 may adjust a course or direction of the autonomous vehicle 802 to begin moving towards the location of the energy supply station 804.

In some examples, the vehicle 802 may detect an arrival at the energy supply station 804. For example, the vehicle 802 may detect on the digital maps a current location associated with the vehicle 802 is next to or at the location of the energy supply station 804. The vehicle 802 may detect one or more objects 816 associated with the energy supply station 804 to determine arrival at the energy supply station 804. The objects 816 may be a column of objects at predefined intervals (e.g., distances), a stack of objects, images, predefined shapes, figures, articles, painted objects, objects placed on a roadway next to the energy station 804, objects placed next to the roadway, or any combination thereof. The objects 816 may be a physical indication of arrival at the energy supply station 804 and of a defined location 818 to stop the vehicle 802 for energy supply.

The vehicle 802 may detect the objects 816 via the sensors 806. For example, the vehicle 802 may obtain image or video data indicating the objects 816 via the sensors 806 (e.g., image or video capturing devices) located on or at the front side 812 of the vehicle 802. The vehicle 802 may be configured to identify the objects 816 based on the obtained image or video data, or the vehicle 802 may communicate the image or video data to the system 826 (or another remote server) to receive an indication that the image or video data is associated with the objects 816.

The vehicle 802 may stop at the defined location 818. To do so, the vehicle 802 may determine the defined location 818 based on the objects 816. For example, the objects 816 may indicate the defined location 818. The defined location 818 may be between a first object 816 and a second object 816. The defined location 818 may be proximate to the objects 816 or indicated by the objects 816 in a similar way. The vehicle 802 may be configured with the location of the defined location 818 in relation to the objects 816 or may receive an indication of the location of the defined location 818 in relation to the objects 816.

In some cases, the vehicle 802 may adjust a location to stop the vehicle 802. For example, upon arrival at the energy supply station 804 (e.g., proximate to the defined location 818), the vehicle 802 may adjust (e.g., move forward, move backward, move closer to the energy supply station 804) the location of the vehicle 802. To do so, the vehicle 802 may switch to processing image or video data from the sensors 808 located at the lateral side 814 of the vehicle 802. For example, the vehicle 802 may sense (e.g., calculate, determine, generate) a distance 840 between the vehicle 802 and the energy supply station 804 via the sensors 808 (e.g., via the data from the sensors 808). Based on the distance 840, the vehicle 802 may adjust the location (e.g., position) of the vehicle 802 until the distance 840 satisfies a distance threshold. The threshold may indicate a distance sufficient for the energy supply station 804 to supply the vehicle 802 with energy (e.g., for the energy delivery receptacle 822 to reach or contact the vehicle 802). In some embodiments, the vehicle 802 may switch to processing the data from the sensors 808 upon detecting arrival of the vehicle 802 at the energy supply station 804, upon stopping at the defined position 818, or another moment during the process of resupplying energy to the vehicle 802.

In some examples, the vehicle 802 may open the energy input receptacle 810. For example, the energy input receptacle 810 may be recessed into the vehicle 802. The vehicle 802 may automatically open (e.g., unlatch, swing open, uncover, etc.) a cover 838 of the energy input receptacle 810. In some cases, the vehicle 802 may open the energy input receptacle 810 based on detecting arrival of the vehicle 802 at the energy supply station 804, upon stopping at the defined position 818, or another moment during the process of resupplying energy to the vehicle 802.

The vehicle 802 may be in communication with the system 826. The vehicle 802 may transmit and receive signals 834 over a wireless channel between the vehicle 802 and the system 826 (e.g., the computer 828 of the system 826). For example, the vehicle 802 may transmit an indication of arrival to the computer 828. The computer 828 may transmit acknowledgment, instructions, or another signal to the vehicle 802 in response.

The energy supply station 804 may be in communication with the system 826. The energy supply station 804 may transmit and receive signals 836 over a wireless channel between the energy supply station 804 and the system 826 (e.g., the computer 828 of the system 826). For example, the energy supply station 804 may transmit an indication of arrival to the computer 828. The computer 828 may transmit acknowledgment, instructions, or another signal to the energy supply station 804 in response.

Both the vehicle 802 and the energy supply station 804 may transmit data to the system 826. For example, the vehicle 802 may transmit first image or video data obtained from the sensors 808 (and the sensors 806) of the physical environment 842 to the computer 828. The energy supply station 804 may transmit second image or video data obtained from the sensors 824 of the physical environment 842 to the computer 828. The first image or video data and the second image or video data may depict (e.g., show virtual representation of, indicate) the physical environment 842 from different points of view (e.g., a point of view of the vehicle 802 and a point of view of the energy supply station 804).

Figure 9:
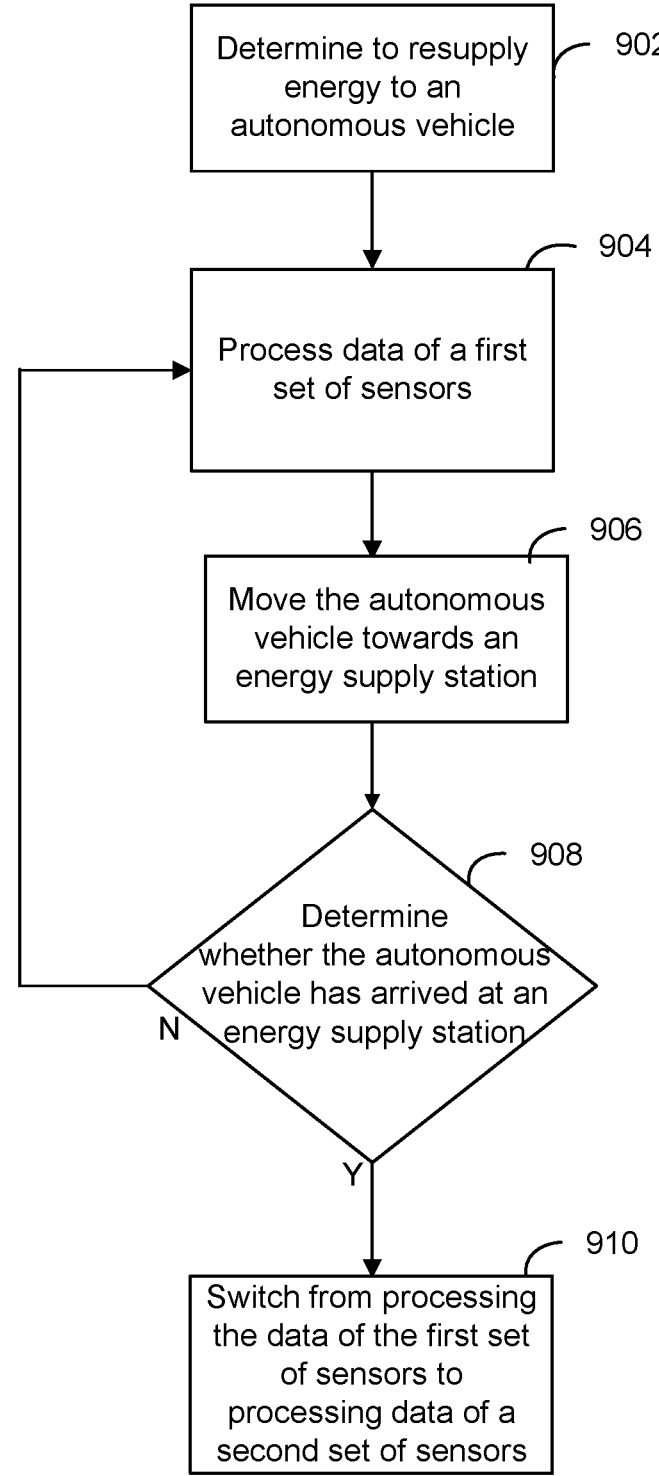
FIGS. 9-10 are methods for supplying energy to an autonomous vehicle via a virtual interface, according to embodiments.

FIG. 9 shows execution steps of a processor-based method using the system 250, according to some embodiments. The method 900 shown in FIG. 9 comprises execution steps 902-910. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

Figure 11:
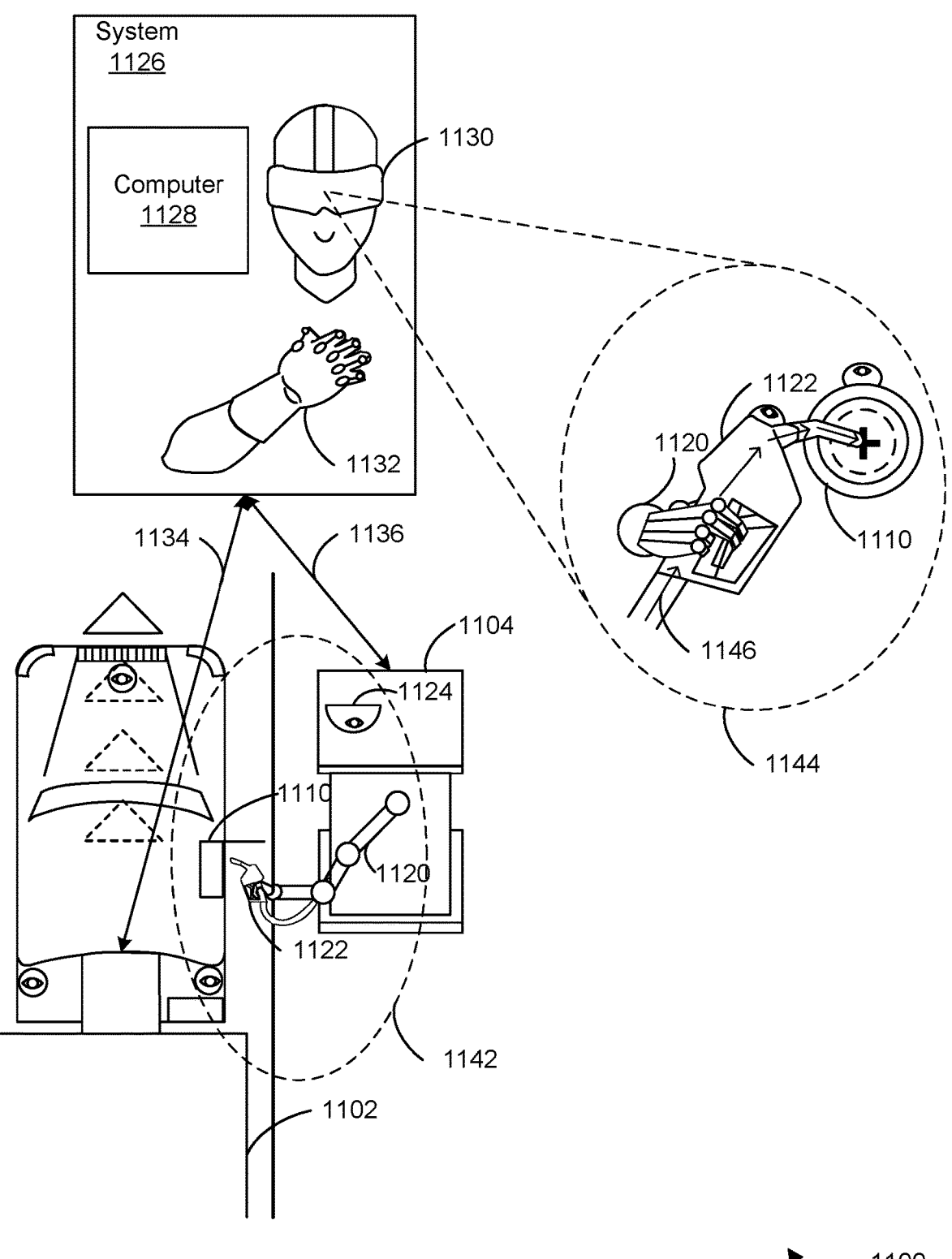
FIG. 11 is a bird's-eye view of a roadway that supports supplying energy to an autonomous vehicle via a virtual interface, according to an embodiment.

FIG. 9 is described as being performed by a data processing system stored or on or otherwise located at an autonomous vehicle, such as the autonomous vehicle 802 or 1102 depicted in FIGS. 8A-B and 11. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

At 902, the data processing system determines to resupply energy to an autonomous vehicle. The data processing system can automatically control, using images generated by a first set of sensors (e.g., one or more sensors) located on a first side (e.g., a front side) of the autonomous vehicle, the autonomous vehicle to an energy supply station responsive to determining to resupply energy to the autonomous vehicle. To do so, at 904, the data processing system processes data of the first set of sensors. At 906, the data processing system moves the autonomous vehicle towards the energy supply station.

At 908, the data processing system determines whether the autonomous vehicle has arrived at the energy supply station. For example, the data processing system can detect, using the images generated by the first one or more sensors, an arrival of the autonomous vehicle at the energy supply station. To do so, the data processing system can detect, via the first one or more sensors, one or more shapes (e.g., objects) on a surface in front of the autonomous vehicle and adjacent to (e.g., in front of, next to, within 50 feet of) the energy supply station and determine the one or more shapes indicate arrival at the energy supply station. The data processing system can determine the one or more shapes indicate the arrival by determining the one or more shapes match a predefined shape of a predefined pattern. Responsive to detecting the arrival of the autonomous vehicle at the energy supply station, the data processing system can open the energy input receptacle. Opening the energy input receptacle can enable a mechanical arm of the energy supply station to supply energy to the autonomous vehicle via an energy delivery receptacle of the energy supply station.

At 910, the data processing system switches from processing the data of the first set of sensors to processing data of a second set of sensors (e.g., second one or more sensors) located on a second side (e.g., a lateral side) of the autonomous vehicle. For example, responsive to detecting the arrival of the autonomous vehicle at the energy supply station, the data processing system can switch from processing images generated by the first one or more sensors to processing images generated by the second one or more sensors. In some cases, to switch, the data processing system can stop processing data of the first one or more sensors and begin processing data of the second one or more sensors.

In some cases, the data processing system may adjust a position of the autonomous vehicle. For example, the data processing system can adjust, using images generated by the second one or more sensors, the position of the autonomous vehicle to align an energy input receptacle of the autonomous vehicle with the energy delivery receptacle of the energy supply station. The data processing system can control the autonomous vehicle to move the autonomous vehicle to be a predefined distance from the energy supply station based on data generated by the second one or more sensors.

In some examples, the data processing system can transmit, to a remote computer, a signal. The signal can comprise the data of the first one or more sensors and the data of the second one or more sensors to enable the remote computer to generate a virtual interface for a user to control a mechanical arm of the energy supply station. The data can include image or video data of a physical environment surrounding the autonomous vehicle.

In some cases, the data processing system can close the energy input receptacle. For example, responsive to determining the autonomous vehicle has received energy from the energy supply station, the data processing system can close the energy input receptacle of the autonomous vehicle. The data processing system can move the autonomous vehicle away from the energy supply station.

The data that the data processing system can collect can relate to vehicles or other objects in the area surrounding the vehicle in which the data processing is located. For example, the data processing system can collect images, LiDAR data, or radar data depicting other vehicles on the same road as the data processing system, objects in the middle of the road, and/or signs or traffic lights around the road. The data processing system can also collect data related to the current location of the vehicle through the GPS. The data processing system can collect such data, tag the data with timestamps indicating the times in which the data processing system received the collected data (unless the data collection systems did not already tag the data) and store the tagged data in memory. The data processing system can retrieve and/or process such data from memory to detect other vehicles or objects in or on the road.

The data processing system can collect data over a network. The data processing system can do so using a transceiver, for example. Over the network, the data processing system can collect geolocation data indicating the location of the vehicle and/or characteristics of the environment surrounding the vehicle. In one example, the data processing system can transmit a current location of the vehicle to an external or remote processor. The external or remote processor can receive the location and identify a speed limit of the current location based on the received current location of the vehicle. The external or remote processor may also identify other aspects of the environment, such as upcoming road signs or traffic lights based on the current location. The external or remote processor may transmit identifications of such characteristics to the data processing system upon identifying the characteristics based on the current location of the vehicle.

Figure 10:
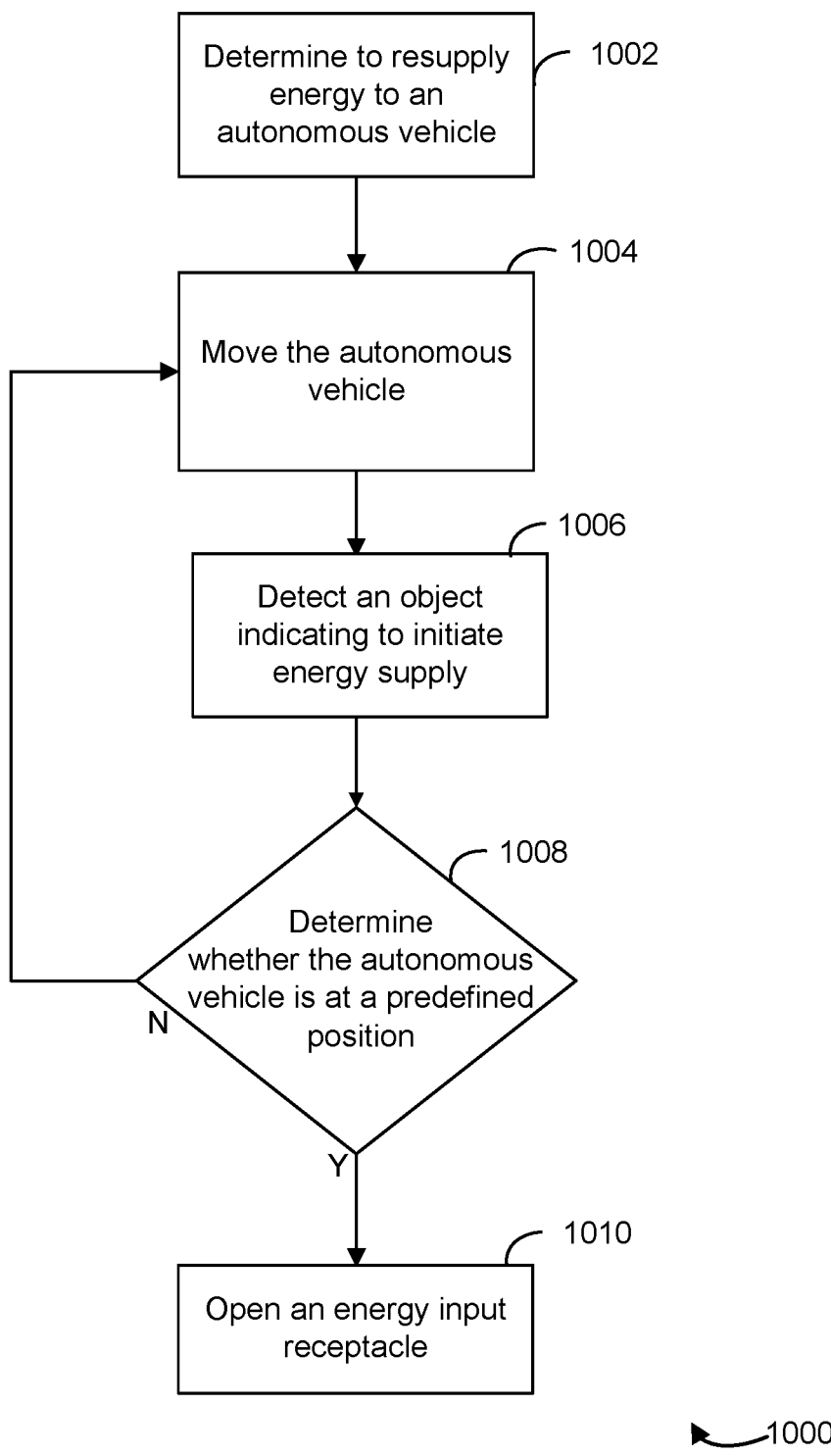

FIG. 10 shows execution steps of a processor-based method using the system 250, according to some embodiments. The method 1000 shown in FIG. 10 comprises execution steps 1002-1010. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 10 is described as being performed by a data processing system stored or on or otherwise located at an autonomous vehicle, such as the autonomous vehicle 802 and 1102 depicted in FIGS. 8A-B and 11. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

At 1002, the data processing system determines to resupply energy to an autonomous vehicle. At 1004, the data processing system automatically controls the autonomous vehicle to an energy supply station responsive to determining to resupply energy to the autonomous vehicle. To do so, the data processing system can include a sensor (e.g., one or more sensors). The sensor can be an image capturing device or a video capturing device.

At 1006, the data processing system detects an object indicating to initiate energy supply. For example, the data processing system can detect, via the sensor, an object corresponding to the energy supply station. The object can indicate to initiate energy supply to the autonomous vehicle. In some embodiments, the data processing system can detect the object by detecting a shape painted on a surface adjacent to the energy supply station. In some embodiments, the data processing system can detect multiple shapes painted on a surface adjacent to the energy supply station.

At 1008, the data processing system determines whether the autonomous vehicle is at a predefined position. For example, the data processing system can control the autonomous vehicle to stop when the autonomous vehicle reaches a defined position. The defined position can be between a first shape of the plurality of shapes and a second shape of the plurality of shapes. In some cases, the data processing system can determine the defined position based on one or more distances related to at least two of the energy supply station, the object, or the autonomous vehicle.

Responsive to determining the autonomous vehicle is at the predefined position, at 1010, the data processing system opens an energy input receptacle. For example, the data processing system can open an energy input receptacle of the autonomous vehicle to receive energy from the energy supply station. In some cases, the data processing system can open the energy input receptacle to enable a mechanical arm of the energy supply station to supply energy to the autonomous vehicle via an energy delivery receptacle. In some cases, the data processing system can open a cover of the energy input receptacle.

In some examples, the data processing system can obtain image or video data. For example, the data processing system can obtain, from the sensor, image or video data of a physical environment surrounding the autonomous vehicle, the physical environment comprising the object. The data processing system can transmit, to a remote computer, a signal comprising the image or video data of the physical environment surrounding the autonomous vehicle to enable the remote computer to generate a virtual interface for a user to control a mechanical arm of the energy supply station.

In some cases, the data processing system can determine whether the autonomous vehicle is full. For example, responsive to determining the autonomous vehicle has received energy from the energy supply station, the data processing system can close the energy input receptacle of the autonomous vehicle. The data processing system can automatically control the autonomous vehicle away from the energy supply station. In some cases, the energy may be at least one of petrol, diesel, electricity, or natural gas.

FIG. 11 is a bird's-eye view of a roadway that supports supplying energy to autonomous vehicles via a virtual interface, according to an embodiment. FIG. 11 illustrates an environment 1100 that includes a vehicle 1102, an energy supply station 1104, and a system 1126. The vehicle 1102 can include an energy input receptacle 1110. The vehicle 1102 can be the same as or similar to the vehicle 102 and the vehicle 802. The system 1126 can include a computer 1128, a head wearable device 1130, and a hand wearable device 1132. The computer 1128 can be the same as or similar to the remote servers 122 or 270 and the computer 828. The energy supply station 1104 can include a mechanical arm 1120, and an energy delivery receptacle 1122. The energy supply station 1104 can be the same as or similar to the energy supply stations 304 and 804.

The vehicle 1102, the energy supply station 1104, and the system 1126 can communicate via a network. For example, the vehicle 1102 and the energy supply station 1104 can collect data regarding a physical environment 1142 (e.g., a physical area). The vehicle 1102 and the energy supply station 1104 can respectively transmit respective data (e.g., first image or video data and second image or video data) to the system 1126 (e.g., the computer 1128), as described herein with reference to FIGS. 8A-B.

The computer 1128 may process the received data and generate a virtual interface 1144 of the physical environment 1142. For example, the computer 1128 may combine the first image or video data and the second image or video data to generate the virtual interface 1144. Because the first and second data are from different points of views, the virtual interface 1144 may include virtual (e.g., visual) representations of the physical environment 1142 from multiple points of views. For example, the virtual interface 1144 can include virtual representations of the energy supply station 1104, the mechanical arm 1120, the energy delivery receptacle 1122, the vehicle 1102, and the energy input receptacle 1110.

The computer 1128 may display (e.g., project, transfer) the virtual interface 1144 to the head wearable device 1130. For example, the computer 1128 may send data indicating the virtual interface 1144 (e.g., the virtual depictions of the physical environment 1142) to the head wearable device 1130. The head wearable device 1130 may process the data and display the virtual interface 1144 to an operator wearing the head wearable device 1130. The operator may see a virtual representation of the physical environment 1142 from the point of view of the energy supply station 1104, the mechanical arm 1120, the energy delivery receptacle 1122, or another point of view.

The computer 1128 may be communicatively coupled with the hand wearable device 1132. For example, the operator may wear the hand wearable device 1132. The hand wearable device 1132 may detect (e.g., sense) one or more movements from the operator. For example, the hand wearable device 1132 may detect a first movement of a first finger, a second movement of a wrist, a third movement of an arm, or any combination thereof. The hand wearable device 1132 may convert (e.g., generate, calculate) the detected movements to computer-readable instructions (e.g., data). The hand wearable device 1132 may transmit (e.g., send) the instructions to the computer 1128.

In some embodiments, the head wearable device 1130 may be communicatively coupled with the computer 1128. For example, the head wearable device 1130 may detect movements from the operator. For example, the head wearable device 1130 may detect movements of the head of the operator (e.g., where the operator is looking based on head tilt, rotation, and other movements). The head wearable device 1130 may update (e.g., change, shift) the display of the virtual interface 1144 based on the detected movements. In some cases, the head wearable device 1130 may transmit the movements (e.g., data) to the computer 1128.

The computer 1128 may receive the data (e.g., the instructions from the hand wearable device 1132, the movements from the head wearable device 1130) and transmit (e.g., relay, send) the instructions to the energy supply station 1104. The energy supply station 1104 may receive and process the instructions and/or movements. The energy supply station 1104 may move a direction of the sensor 1124 based on the movements received. The energy supply station 1104 may move the mechanical arm 1120 based on the instructions received. For example, the operator may move their head to see the mechanical arm 1120, the energy delivery receptacle 1122, and the energy input receptacle 1110 and the operator may move their arm, hand, and fingers to grab the energy delivery receptacle 1122 and input (e.g., contact, couple) the energy delivery receptacle 1122 into the energy input receptacle 1110. The operator may pull (e.g., activate) a trigger of the energy delivery receptacle 1122 to initiate delivery of energy to the vehicle 1102. The head wearable device 1130 and the hand wearable device 1132 can detect the movements by the operator to accomplish the delivery of energy to the vehicle 1102 and send commands (e.g., instructions) to the energy supply station 1104 to perform respective actions associated with the delivery of energy to the vehicle 1102.

Figure 12:
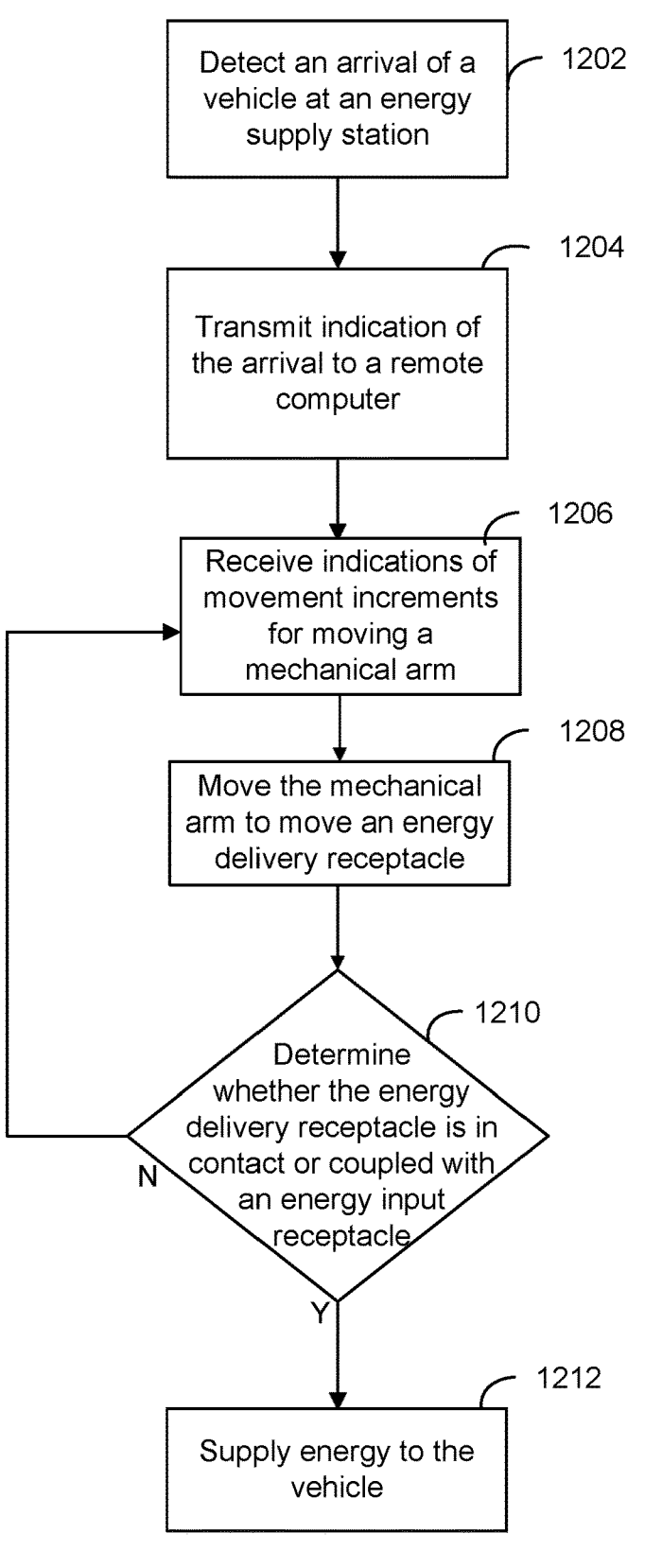
FIGS. 12-13 are methods for supplying energy to an autonomous vehicle via a virtual interface, according to embodiments.

FIG. 12 shows execution steps of a processor-based method using the system 250, according to some embodiments. The method 1200 shown in FIG. 12 comprises execution steps 1202-1212. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 12 is described as being performed by a data processing system stored or on or otherwise located at an energy supply station, such as the energy supply station 804 and 1104 depicted in FIGS. 8A-B and 11. However, in some embodiments, one or more of the steps may be performed by a different processor, server, or any other computing feature. For instance, one or more of the steps may be performed via a cloud-based service or another processor in communication with the processor of an energy supply station and/or the autonomy system of such an energy supply station.

At 1202, the data processing system detects an arrival of a vehicle at an energy supply station. For example, the energy supply station can include a sensor. The sensor can be an image capturing device or a video capturing device. The data processing system can obtain, from the sensor, a signal comprising image or video data. The data processing system can detect the arrival of the vehicle based on determining that the image or video data indicates the vehicle.

Responsive to detecting an arrival of the vehicle at the energy supply station, at 1204, the data processing system transmits an indication of the arrival to a remote computer, causing activation of a virtual interface. For example, the data processing system can transmit, to the remote computer, the signal including the image or the video data. The signal can enable generation of the virtual interface. In some cases, the virtual interface depicts a physical environment surrounding the vehicle based on the image or video data and enables a user to provide input to move a mechanical arm.

At 1206, the data processing system receives indications of movement increments. For example, the energy supply station can include a mechanical arm and an energy delivery receptacle coupled with the mechanical arm, the energy delivery receptacle configured to deliver energy to vehicles. The data processing system can, responsive to an input (e.g., the indications) at the virtual interface, move the mechanical arm to cause the energy delivery receptacle to contact or couple with an energy input receptacle of the vehicle. For example, the data processing system can receive, from the remote computer, the input. The input can include one or more signals comprising indications of movement increments for the mechanical arm. In some cases, moving the mechanical arm includes moving the mechanical arm according to the movement increments.

At 1208, the data processing system moves the mechanical arm to move the energy delivery receptacle. For example, the data processing system can move the mechanical arm to grab a handle of the energy delivery receptacle. The data processing system can move the energy delivery receptacle, via the mechanical arm, to contact or couple with an energy input receptacle of the vehicle.

At 1210, the data processing system determines whether the energy delivery receptacle is in contact or coupled with the energy input receptacle. For example, the data processing system can detect the energy delivery receptacle is in contact or coupled with the energy input receptacle of the vehicle. To do so, the data processing system can receive a signal from a pressure sensor of the mechanical arm or the energy delivery receptacle. The data processing system can detect the energy delivery receptacle is in contact or coupled with the energy input receptacle of the vehicle based on the signal indicating the energy delivery receptacle is in contact or coupled with the energy input receptacle of the vehicle.

At 1212, the data processing system supplies energy to the vehicle. For example, responsive to detecting the energy delivery receptacle is in contact or coupled with the energy input receptacle of the vehicle, the data processing system can supply the vehicle with energy. In some embodiments, the data processing system can receive a signal, from the remote computer, indicating activation of an energy delivery system of the energy supply station. Responsive to receiving the signal, the data processing system can supply the vehicle with energy. The energy can include at least one of petrol, diesel, electricity, or natural gas.

Figure 13:
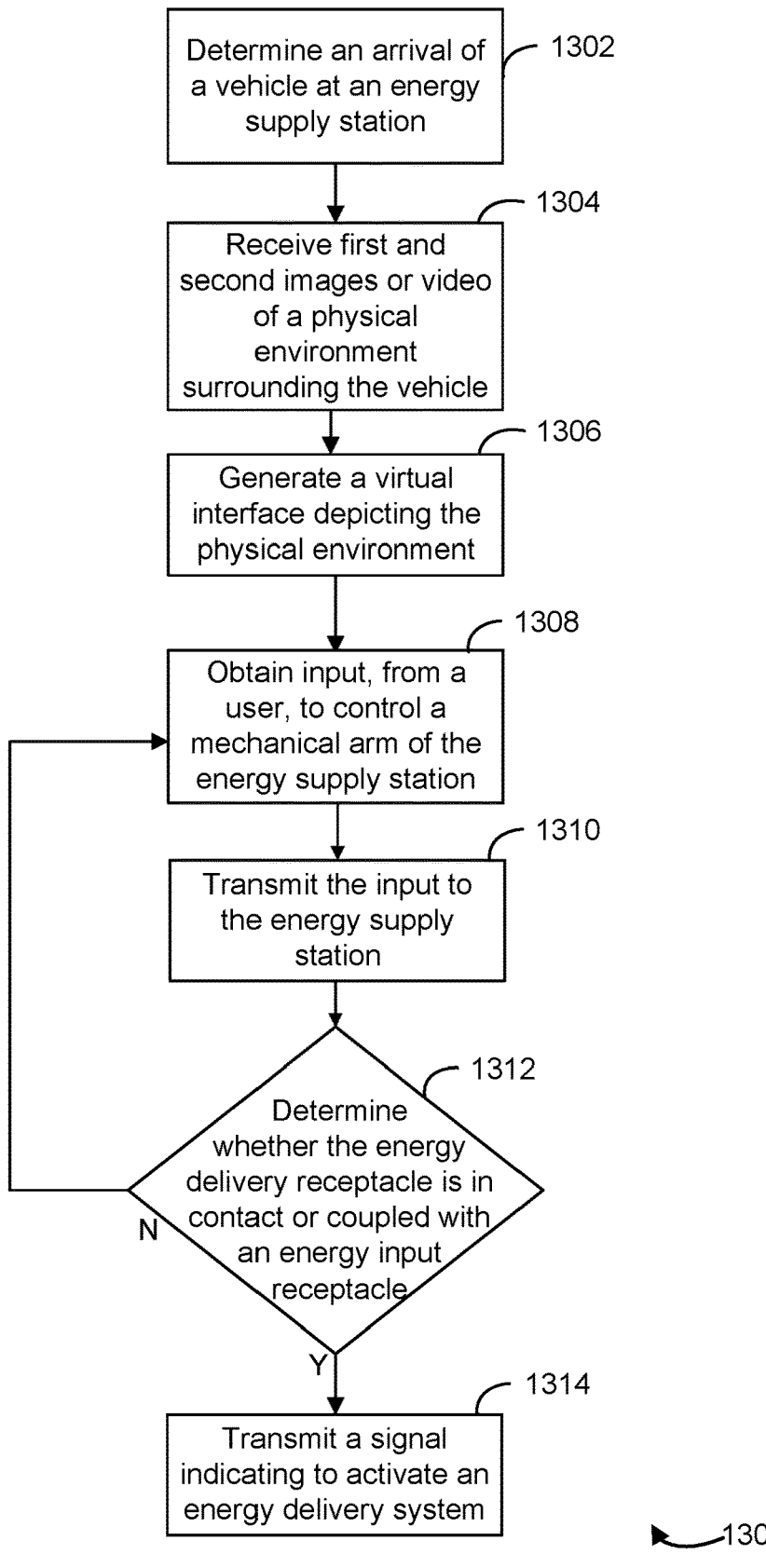

FIG. 13 shows execution steps of a processor-based method using the system 250, according to some embodiments. The method 1300 shown in FIG. 13 comprises execution steps 1302-1312. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 13 is described as being performed by a data processing system stored or on or otherwise located at a remote server, such as the systems 826 and 1126 depicted in FIGS. 8A-B and 11. However, in some embodiments, one or more of the steps may be performed by a different processor, server, or any other computing feature. For instance, one or more of the steps may be performed via a cloud-based service or another processor in communication with the processor of a remote server and/or the autonomy system of such a remote server.

At 1302, the data processing system determines an arrival of a vehicle at an energy supply station. At 1304, the data processing system receives first and second images or video. For example, the data processing system can receive, from a vehicle via first one or more sensors of the vehicle, the first images or video of a physical environment surrounding the vehicle. The data processing system can receive, from an energy supply station via second one or more sensors of the energy supply station, the second images or video of the physical environment surrounding the vehicle. The first one or more sensors and the second one or more sensors can be image capturing devices or video capturing devices.

At 1306, the data processing system can generate a virtual interface depicting the physical environment. For example, responsive to receiving the first images or video and the second images or video, the data processing system can generate the virtual interface depicting the physical environment based on the first images or video and the second images or video. The virtual interface can include multiple points of views of the physical environment based on the first images or video and the second images or video being obtained from multiple sources. In some cases, the physical environment is the area between the vehicle and the energy supply station that includes the vehicle and the energy supply station.

At 1308, the data processing system obtains input, from a user. For example, the virtual interface can enable a user to provide input to control a mechanical arm of the energy supply station to supply energy to the vehicle. At 1310, the data processing system transmits the input. For example, the data processing system can transmit, to the energy supply station, the input to control the mechanical arm of the energy supply station to supply energy to the vehicle. The transmitted input can include indications of movement increments for the mechanical arm.

At 1312, the data processing system determines whether an energy delivery receptacle is in contact or coupled with an energy input receptacle. For example, energy supply station can include the energy delivery receptacle to deliver energy to the vehicle. The vehicle can include the energy input receptacle to receive energy from the energy supply station.

At 1314, the data processing system transmits a signal indicating to activate an energy delivery system. For example, the data processing system can transmit, to the energy supply station, a signal indicating to activate an energy delivery system of the energy supply station to supply energy to the vehicle. The signal can include an indication to initiate supplying energy to the vehicle through the energy input receptacle of the vehicle.

In some cases, the input to control the mechanical arm of the supply station to supply energy to the vehicle can include instructions to move the mechanical arm to grab the energy delivery receptacle of the energy supply station. The instructions can be to move the energy delivery receptacle to be in contact or coupled with the energy input receptacle of the vehicle. Responsive to being in contact or coupled, the data processing system can initiate supplying energy to the vehicle. The data processing system can transmit, to the energy supply station, a signal indicating to the energy supply station to stop supplying energy to the vehicle. In some cases, the signal can include second input from the user to control the mechanical arm of the energy supply station to return the energy delivery receptacle of the energy supply station to be in contact or coupled with the energy supply station.

In some embodiments, the data processing system can include a computer in wireless communication with a head wearable device and a hand wearable device. The data processing system can display the generated virtual interface to the user via the head wearable device. The data processing system can generate the input to control the mechanical arm via movements of the hand wearable device by the user.

Figure 14:
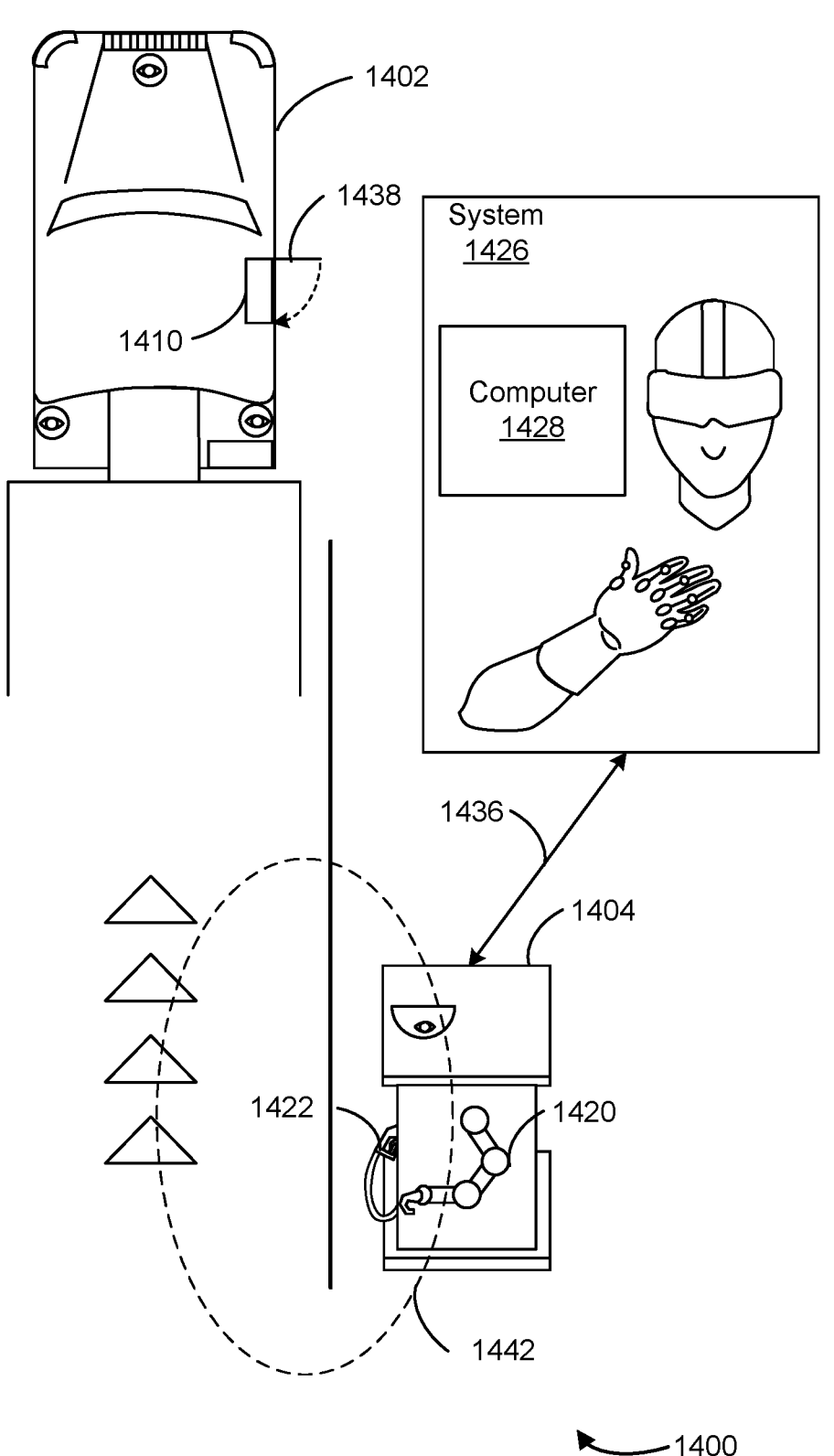
FIG. 14 is a bird's-eye view of a roadway that supports supplying energy to an autonomous vehicle via a virtual interface, according to an embodiment.

FIG. 14 is a bird's-eye view of a roadway that supports supplying energy to autonomous vehicles via a virtual interface, according to an embodiment. FIG. 14 illustrates an environment 1400 that includes a vehicle 1402, an energy supply station 1404, and a system 1426. The vehicle 1402 can include an energy input receptacle 1410 and a cover 1438. The vehicle 1402 can be the same as or similar to the vehicle 102, the vehicle 802, and the vehicle 1102. The system 1426 can include a computer 1428. The computer 1428 can be the same as or similar to the remote server 122 or 270 and the computers 828 and 1128. The energy supply station 1404 can include a mechanical arm 1420, and an energy delivery receptacle 1422. The energy supply station 1404 can be the same as or similar to the energy supply stations 304, 804, and 1104.

The energy supply station 1404 and the system 1426 can communicate via a network. For example, the energy supply station 1404 can collect data regarding a physical environment 1442 (e.g., a physical area). The energy supply station 1404 can transmit the collected data to the system 1426, as described herein with reference to FIGS. 8A-B. The system 1426 can process the received data and generate a virtual interface 1444 of the physical environment 1442. The virtual interface 1444 can include virtual representations of the mechanical arm 1420, the energy delivery receptacle 1422, and the energy input receptacle 1410, as described herein with reference to FIG. 11.

The vehicle 1402 may determine an end to an energy delivery process. For example, the vehicle 1402 may sense (e.g., detect), via a meter or other sensor, a level of energy in the vehicle 1402. The energy supply station 1404 may supply energy to the vehicle 1402 via the energy delivery receptacle 1422 and the mechanical arm 1420, as described herein with reference to FIGS. 8A-B and 11. The vehicle 1402 may detect the level of energy satisfies a threshold (e.g., above a threshold, sufficient amount to complete the current route). In some embodiments, once full, the vehicle 1402 may transmit an indication to stop supplying energy to the computer 1428. The computer 1428 may indicate to the energy supply station 1404 to stop supplying energy to the vehicle 1402. In some embodiments, the energy supply station 1404 may detect (e.g., via a sensor coupled with the energy delivery receptacle 1422) the vehicle 1402 is full (e.g., the level of energy inside the vehicle 1402 satisfies a threshold). The energy supply station 1404 may transmit, to the computer 1428, an indication of completion of supplying energy to the vehicle 1402. In some embodiments, the computer 1428 may transmit, to the energy supply station 1404 to stop supplying energy to the vehicle 1402. For example, the operator may command, via a hand wearable device, the mechanical arm 1420 to release (e.g., deactivate) a trigger of the energy delivery receptacle 1422. The mechanical arm 1420 may release the trigger and the energy delivery receptacle may stop supplying energy to the vehicle 1402.

Responsive to determining the end to the energy delivery process (e.g., having received energy from the energy supply station 1404), the vehicle 1402 may move away from the energy supply station 1404. For example, the vehicle 1402 may continue a current route of the vehicle 1402 having resupplied energy to the vehicle 1402. The vehicle 1402 may close the energy input receptacle 1438 (e.g., a cover for the energy input receptacle) responsive to the determination.

FIG. 15 shows an environment 1500 in which an autonomy system (not shown) of an automated vehicle (shown as a truck 1502) performs calibration operations using any number of surveyed ground points marked with calibration targets 1530a-1530b (generally referred to as a target 1530 or targets 1530).

The truck 1502 is equipped with one or more perception sensors, such as LIDAR 1522 (e.g., long range LIDAR, wide-view LIDAR), radar 1532, and cameras 1520, among other types of perception sensors. The truck 1502 is further equipped with a global navigation satellite system (GNSS) that captures geolocation data (e.g., GPS data, map data) and is further capable of high precision corrections, such as Real-Time Kinematic (RTK) or Post-Processed Kinematic (PPK) corrections.

The physical placement of a particular calibration target 1530 geographically marks a corresponding preconfigured and surveyed ground-point. The calibration target 1530 includes one or more of a surface having various features (e.g., shape, color, reflectivity, height-from-ground) detectable to one or more types (or modality) of sensors 1520, 1522, 1532. The surface of the calibration target 1530 may include one or more surface targets having the various features (e.g., shape, color, reflectivity, height-from-ground). As an example, as shown in FIG. 15, the surface of the calibration target 1530 includes eight surface targets, including two square shapes six circles with varied amounts of retro-reflectivity, radar-reflectivity, and/or high-contrast visual appeal. In some cases, the surface target includes information detectable by one or more sensors 1520, 1522, 1532 and recognizable by a controller of the truck 102. As an example, in FIG. 15, the two square shapes contain quick reference (QR) codes that convey certain information to the truck 1502.

In some embodiments (such as the embodiment in FIGS. 4A-4B), the surveyed ground points include specifically preconfigured locations at an automated vehicle management hub, testing location, or other controlled location. The locations are marked by an array (or "target jungle") of calibration targets 1530. During a specific calibration period, the sensors 1520, 1522, 1532 of the truck 1502 detect the targets 1530 and record each target's 1530 position relative to each sensor 1520, 1522, 1532. The controller of the truck 1502 generates a Retro-Reflective Sign (RRS) pipeline in one or more components of an autonomy system (e.g., Map Localizer component). The controller estimates a position of the truck 1502 by matching the detected retroreflective surfaces of the targets 1530 against known positions stored in map data as a semantic map. This RRS pipeline approach in these embodiments reference accurate calibrations and known positions to estimate the accurate position of the truck 1502, though the RRS pipeline approach need not generate or reference geolocation data (e.g., GPS data, GNSS data) for the targets 1530 or truck 1502.

Additionally or alternatively, in some embodiments, the surveyed ground points include existing landmarks, such as retroreflective signs, roadside calibration targets 1530, road markers, or other road features in a real-world operating environment (e.g., roadway environment 500), as shown in FIG. 5, which may or may not be managed by an owner or operator of the truck 1502. During the specific calibration period or during the regular autonomous operations, the sensors 1520, 1522, 1532 of the truck 1502 detect the targets 1530 and record each target's 1530 position relative to each sensor 1520, 1522, 1532. A controller or other processor of the 1502 or remote device 1570 executes algorithms that match the measured positions of the targets 1530 to locations of the predetermined (pre-surveyed) ground-points, as indicated by a map. The controller generates high-precision corrected position based upon the ground-points indicated by the geolocation in the map data. The controller then calculates an offset and orientation of each sensor 1520, 1532, 1532, relative to the corrected position.

Figure 16A:
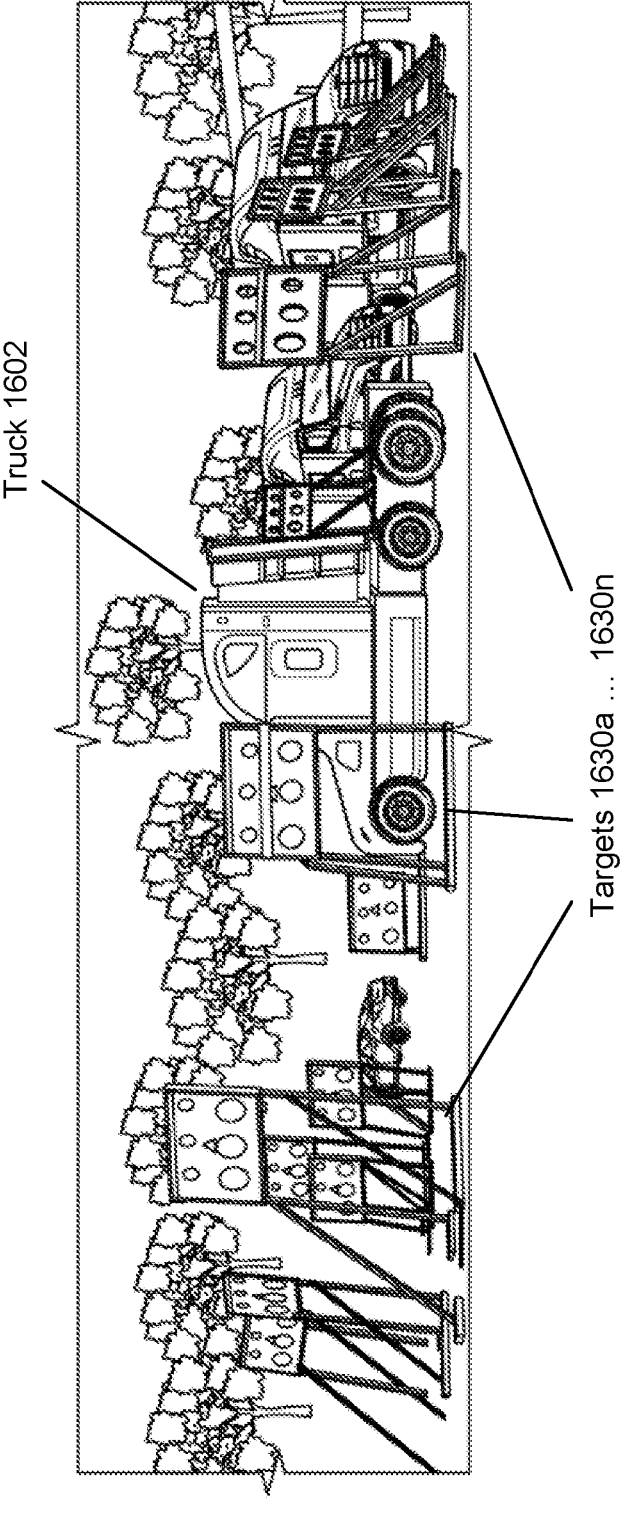
FIGS. 16A-16B shows a calibration environment in which an autonomy system of an automated vehicle performs calibration operations using an array of fixed calibration targets, according to an embodiment.
Figure 16B:
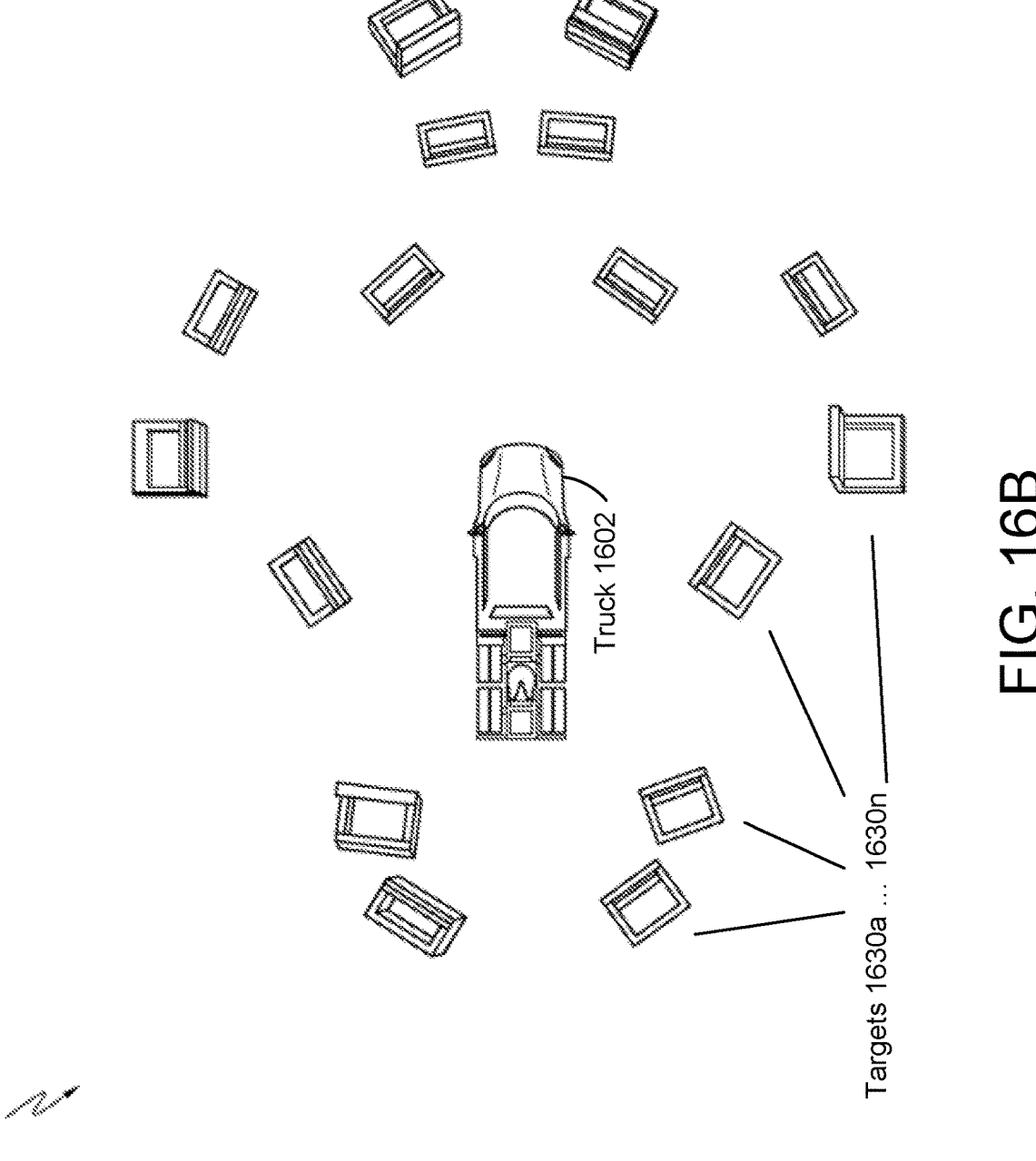

FIGS. 16A-16B show a calibration environment 1600 in which an autonomy system (not shown) of an automated vehicle (shown as a truck 1602) performs calibration operations using an array of multiple surveyed ground points including any number of fixed calibration targets 1630a-1630n (generally referred to as "targets 1630" or a "target 1630"), sometimes referred to as a "target jungle." FIG. 16A is a side view of the calibration environment 1600 having the truck 1602 situated amongst the array of the calibration targets 1630. Similarly, FIG. 16B is a top view of the calibration environment 1600 having the truck 1602 situated amongst the array the fixed calibration targets 1630.

The surveyed ground points include specifically preconfigured, marked locations (array of calibration targets 1630) at an automated vehicle management hub, testing location, or other controlled location. During a specific calibration period, the sensors of the automated vehicle detect the targets 1630 and record each target's 1630 position relative to each sensor.

When perception components (e.g., perception sensors) of the automated vehicle detect the calibration targets 1630, a map localizer component (or other hardware or software component of the automated vehicle) generates a pipeline of Retro-Reflective Signs (RRS's), sometimes referred to as an RRS pipeline. The controller or Map Localizer component matches detected retroreflective surfaces with known positions stored in semantic map data to estimate the vehicle position relative to the targets 1630. The RRS pipeline calibration process uses accurate calibrations and known positions to estimate an accurate vehicle position. This approach need not generate, use, or reference geolocation data (e.g., GPS data, GNSS data).

Figure 17:
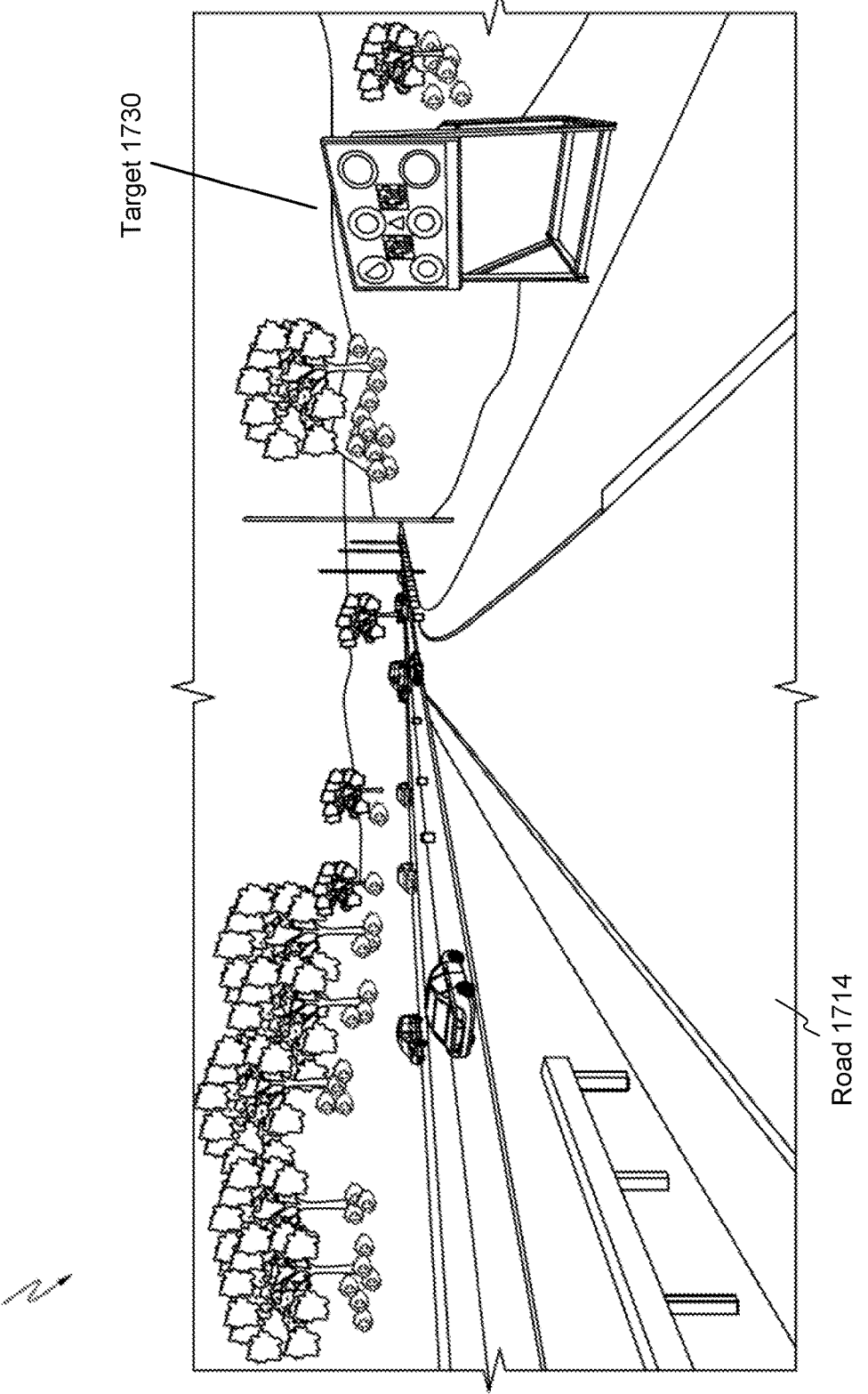
FIG. 17 shows a "real world" roadway environment in which an autonomy an automated vehicle performs calibration operations on-the-fly using a roadside calibration target, according to an embodiment.

FIG. 17 shows a "real world" roadway environment 1700 in which an autonomy system (not shown) of an automated vehicle (e.g., truck 1502) performs calibration operations using one or more roadside calibration targets 1730 situated, for example, alongside a road 1714, allowing the truck to calibrate sensors during real world operation.

A non-transitory machine-readable storage medium contains map data associated surveyed ground points. The storage medium includes, for example, storage locations situated locally at the automated vehicle or at a remote location (e.g., remote server, remote database), which a controller or other processor of the automated vehicle accesses during calibration processes and sensor functions. The survey ground-points correspond to known, expected geolocation points in the map data that the automated vehicle references for sensor calibration operations. The preconfigured and stored map data includes the geolocation information associated with the ground-points marked by real-world objects in the roadway environment 1700, such as roadside calibration targets 1730, landmarks, retroreflective signs, road markers, or other road features alongside the road 1714 or otherwise in the roadway environment 1700.

During the specific calibration period or during the regular autonomous operations, one or more sensors of the automated vehicle detect the target 1730 and record a target position into the storage memory, where the target position indicates a position of the target 1730 relative to each sensor and/or relative to the automated vehicle. The controller of the automated vehicle executes algorithms that match the measured target positions against an expected target location of the predetermined (pre-surveyed) ground-points, as indicated by the map data. The controller generates high-precision corrected position based upon the ground-points indicated by the geolocation in the map data and/or data received from a GNSS instrument of the automated vehicle. The controller then calculates an offset and orientation (or other position-related information) of each sensor and/or the automated vehicle, relative to the corrected position.

FIG. 18 shows operations of a method 1800 for calibrating sensors of an automated vehicle. The method 1800 uses specific ground-points defined by preconfigured surveyed, globally referenced geolocations as known expected information for calibrating the sensors of the automated vehicle.

In operation 1801, one or more perception sensors of the automated vehicle detect a calibration target. The calibration includes one or more surface targets having surface characteristics detectable by the sensors. The sensor then generates various types of information about the target, such as position information indicating a predicted position of the sensor relative to the sensor.

In operation 1803, the sensor records or stores the target position information of the calibration target into a local or remote non-transitory machine-readable storage location. In some cases, a controller or other processor device of the automated vehicle instructs a GNSS to determine a vehicle geolocation (e.g., GPS information) of the automated vehicle and/or the sensor.

In operation 1805, using the target position information, the controller or processor of the automated vehicle generates corrected geolocation information according to RTK and/or PPK processes. The processor of the automated vehicle queries map data indicating expected target geolocations and stored in the local or remote storage location. The controller executes algorithms that match the measured target positions against the map data of pre-surveyed points indicating the expected locations of the calibration target. The controller uses the comparison to determine the corrected location or position information.

In operation 1807, the controller determines position and/or orientation information (sometimes referred to as "position" or "positioning information" for ease of description) of the automated vehicle and/or sensor. For instance, the controller calculates a position offset and orientation of each sensor relative to the corrected position or location of the automated vehicle or sensor. Using the corrected GPS information (e.g., RTK and/or PPK data), the controller determines, for example, the positioning of a particular sensor, the positioning of the automated vehicle, or the positioning information the calibration target, among other features of an operating environment (e.g., roadway environment; calibration environment).

In operation 1809, the controller generates calibration values to obtain accurate calibration settings of the automated vehicle sensors. In some cases, the controller compares the calculated calibration values against existing calibration settings values for the sensor and generates a warning notification in response to determining that the existing calibration settings are mis-calibrated, in response to determining that the differences fails to satisfy a calibration threshold. The warning notification indicates, for example, the sensor is mis-calibrated, imprecise, inaccurate. In some cases, the warning notification configures vehicle software to operate with reduced accuracy or directly applies the updates to the vehicle according to the calibration values.

Automated vehicles utilize sensors to perceive aspects of surrounding environments. Based on the perception of the surrounding environments, the vehicles can make multiple important decisions. For example, an autonomous vehicle may perceive a curvature in a roadway coming closer. The autonomous vehicle may determine when, and by what degree, to begin turning based on the detected curvature. This and many other use cases utilize perception data obtained from the sensors. If the data is off (e.g., the sensors are miscalibrated or misaligned), the autonomous vehicle may turn too much, too early, too late, or may perform many other types of errors that may lead to deficiencies in safely controlling the autonomous vehicle to its destination. However, calibration of the autonomous vehicle is difficult to set up, perform, and can cause a delay in operations of the autonomous vehicle.

The techniques described herein may overcome the aforementioned technical deficiencies. For example, the autonomous vehicle may perform a resupply operation. The autonomous vehicle may detect an amount of energy needed to complete a current route is deficient. The autonomous vehicle may locate and arrive at an energy supply station. While at the energy supply station and as part of the resupply operation, the autonomous vehicle may detect a calibration target (e.g., a stationary calibration target) in an area surrounding the autonomous vehicle while at the energy supply station. The autonomous vehicle may collect, from one or more sensors, data corresponding to the calibration targets and calibrate the perception sensor based on the collected data. To do so, the autonomous vehicle may compare (e.g., reference) the collected data with preconfigured (e.g., expected, known) values. If the comparison satisfies a threshold (e.g., a difference threshold), the autonomous vehicle can adjust one or more parameters associated with the sensors to compensate for the differences (e.g., recalibrate or reset the sensors to generate accurate or precise data).

Advantageously, by calibrating the sensors at energy supply stations, autonomous vehicles can reliably recalibrate their sensors without relying on driving routes that include calibration targets. Additionally, calibration targets may be more easily monitored to avoid malicious parties from moving the calibration targets or such that if the calibration targets to move from a dedicated location, the movement can be more easily detected and/or resolved.

Figure 19:
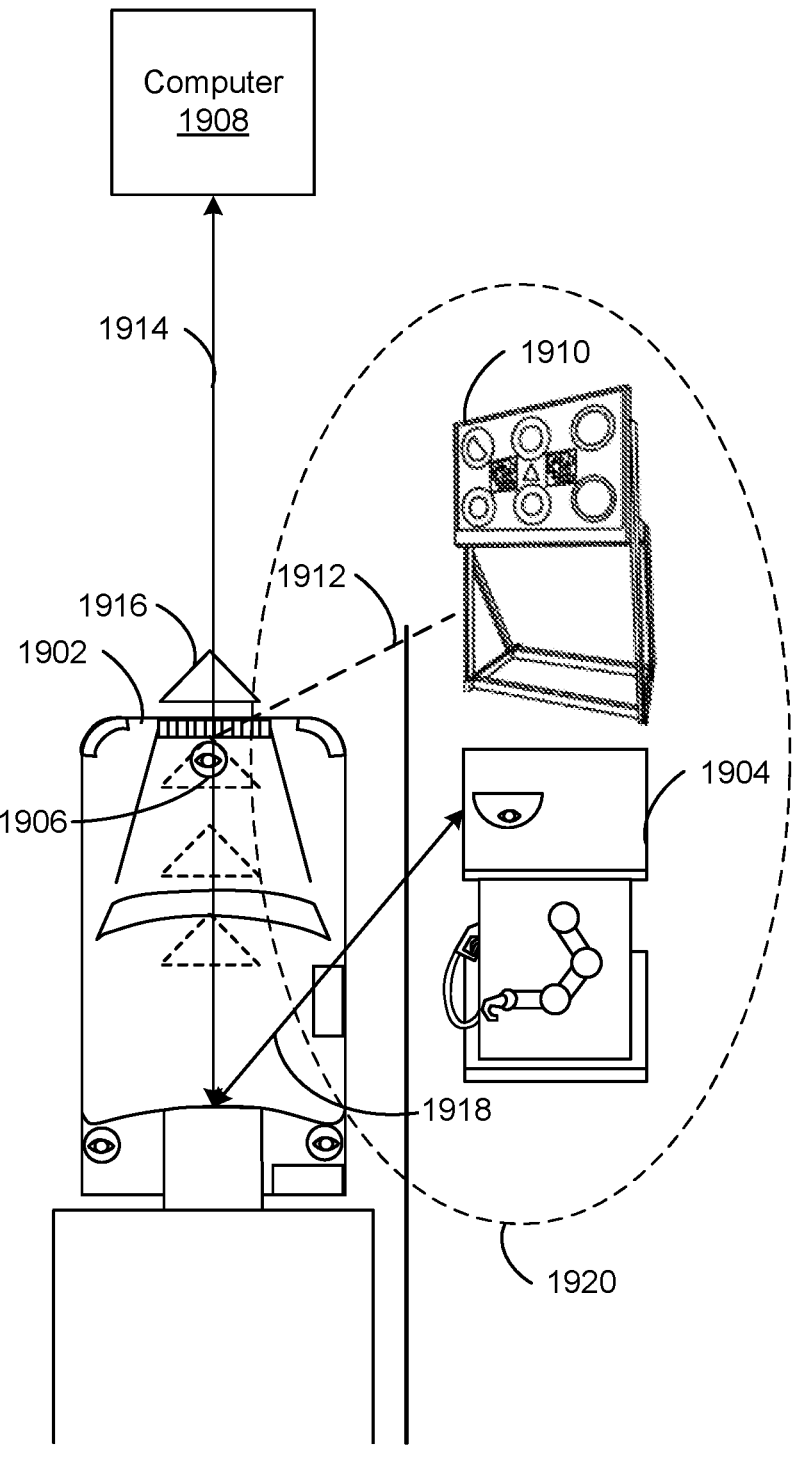
FIG. 19 is a bird's-eye view of a roadway that supports calibrating sensors of an autonomous vehicle, according to an embodiment.

FIG. 19 is a bird's-eye view of a roadway that supports calibrating sensors of an autonomous vehicle, according to an embodiment. FIG. 19 illustrates an environment 1900 that includes an autonomous vehicle 1902, an energy supply station 1904, a computer 1908, and a target 1910. The autonomous vehicle 1902 can include one or more sensors 1906. The autonomous vehicle 1902 can be the same as or similar to the vehicle 102, the vehicle 802, and the vehicle 1502. The computer 1908 can be the same as or similar to the remote server 122 or 270 and the computers 828 and 1128. The energy supply station 1904 can include a mechanical arm and an energy delivery receptacle. The energy supply station 1904 can be the same as or similar to the energy supply stations 304, 804, and 1104. The target 1910 can be the same as or similar to the targets 1530 and 1630. The autonomous vehicle 1902 can perform calibration operations using the target 1910 (e.g., one or more road targets), for example, alongside or on a surface of the energy supply station 1904, allowing the autonomous vehicle 1902 to calibrate the sensors 1906.

The autonomous vehicle 1902 can be equipped with the sensors 1906. The sensors 1906 may include multiple types of perception sensors, such as LiDAR, radar, or camera sensors, among others. In some cases, the sensors 1906 may include or the autonomous vehicle 1902 may further be equipped with a GNSS that can capture geolocation data (e.g., GPS data, map data) of the autonomous vehicle 1902 and may be capable of precision corrections. The precision corrections may be RTK or PPK corrections, or any other type of precision correction.

A physical placement of a particular calibration target 1910 may geographically mark a corresponding preconfigured and surveyed ground-point (e.g., at the energy supply station 1904, on the energy supply station 1904, near the energy supply station 1904, or within an area surrounding the autonomous vehicle 1902 while resupplying at the energy station 1904). The calibration target 1910 may include one or more surfaces having various features (e.g., shape, color, reflectivity, height-from-ground) detectable to one or more types (or modality) of sensors 1906. The surface of the calibration target 1910 may include one or more surface targets having the various features (e.g., shape, color, reflectivity, height-from-ground). As an example, the surface of the calibration target 1910 can include eight surface targets, including two square shapes and six circles with varied amounts of retro-reflectivity, radar-reflectivity, and/or high-contrast visual appeal. In some cases, the surface target can include information detectable by one or more sensors 1906 and recognizable by a controller of the autonomous vehicle 1902. As an example, the two square shapes contain QR codes that convey certain information to the autonomous vehicle 1902. In some cases, the surveyed ground-points are located in a physical area 1920 surrounding the autonomous vehicle 1902 and the energy supply station 1904.

In some embodiments, the surveyed ground-points include specifically preconfigured locations at the energy supply station 1904 (e.g., a controlled location). The pre-configured locations may be marked by an array (or "target jungle") of calibration targets 1910 or a singular calibration target 1910. During a calibration period (e.g., during the resupply operation), the sensors 1906 of the autonomous vehicle 1902 may detect the targets 1910 and record a position associated with each target 1910 relative to each sensor 1906. For example, the autonomous vehicle 1902 may stop at a predefined location (e.g., relative to objects 1916). The predefined location may be a known distance 1912 from the target 1910. The controller of the autonomous vehicle 1902 may generate an RRS pipeline in one or more components of an autonomy system (e.g., Map Localizer component). The controller may estimate a position of the autonomous vehicle 1902 by matching the detected retrore-flective surfaces of the targets 1910 against known positions (e.g., the known positions associated with the predefined location and the distance 1912) stored in map data as a semantic map. This RRS pipeline approach in these embodiments reference accurate calibrations and known positions to estimate the accurate position of the autonomous vehicle 1902, though the RRS pipeline approach need not generate or reference geolocation data (e.g., GPS data, GNSS data) for the targets 1910 or the autonomous vehicle 1902.

Additionally or alternatively, in some embodiments, the surveyed ground points include existing landmarks, such as retroreflective signs, roadside calibration targets 1910, road markers, or other road features or energy supply features, which may or may not be managed by an owner or operator of the autonomous vehicle 1902. During the calibration period or during the energy resupply operation, the sensors 1906 of the autonomous vehicle 1902 may detect the targets 1910 and record a position for each target 1910 relative to each sensor 1906. A controller or other processor of the autonomous vehicle 1902, or the computer 1908, may execute one or more algorithms that match the measured positions of the targets 1910 to locations of the predetermined (pre-surveyed) ground-points, as indicated by a map. The controller may generate high-precision corrected positions based on the ground-points indicated by the geolocation in the map data. The controller may calculate an offset and orientation of each sensor 1910, relative to the corrected position.

In some cases, a non-transitory machine-readable storage medium of the autonomous vehicle 1902 can include map data associated with the surveyed ground points. The storage medium includes, for example, storage locations situated locally at the automated vehicle 1902 or at a remote location (e.g., remote server, remote database, the computer 1908), which a controller or other processor of the automated vehicle 1902 can access during calibration processes and sensor functions. The survey ground-points correspond to known, expected geolocation points in the map data that the automated vehicle 1902 references for sensor calibration operations. The preconfigured and stored map data includes the geolocation information associated with the ground-points marked by real-world objects in the roadway environment 1900, such as roadside calibration targets 530, landmarks, retroreflective signs, road markers, or other road features alongside the road 514 or otherwise in the roadway environment 500 (e.g., attached to a surface of the energy supply station 1904, affixed to an object separate from the energy supply station 1904).

In some examples, the autonomous vehicle 1902 may obtain the map data. For example, the autonomous vehicle 1902 may be in wireless communication with the energy supply station 1904, the computer 1908, or both. The autonomous vehicle 1902 may transmit an indication of arrival at the energy supply station or an indication to provide the map data to the autonomous vehicle 1902. For example, the autonomous vehicle 1902 may transmit, via a communication channel 1914, the indication to the computer 1908. Responsive to receiving the indication, the computer 1908 may transmit the map data to the autonomous vehicle 1902. In another example, the autonomous vehicle 1902 may transmit, via a communication channel 1918, the indication to the energy supply station 1904. The energy supply station 1904 may transmit the map data to the autonomous vehicle 1902.

During the specific calibration period or during the resupply operations, the one or more sensors 1906 of the automated vehicle 1902 may detect the target 1910 and record a target position into the storage memory, where the target position indicates a position of the target 1910 relative to each sensor 1906 and/or relative to the automated vehicle 1902. The controller of the automated vehicle executes algorithms that match the measured target positions against an expected target location of the predetermined (pre-surveyed) ground-points, as indicated by the map data. The controller generates high-precision corrected position based upon the ground-points indicated by the geolocation in the map data and/or data received from a GNSS instrument of the automated vehicle. The controller then calculates an offset and orientation (or other position-related information) of each sensor and/or the automated vehicle, relative to the corrected position.

Figure 20:
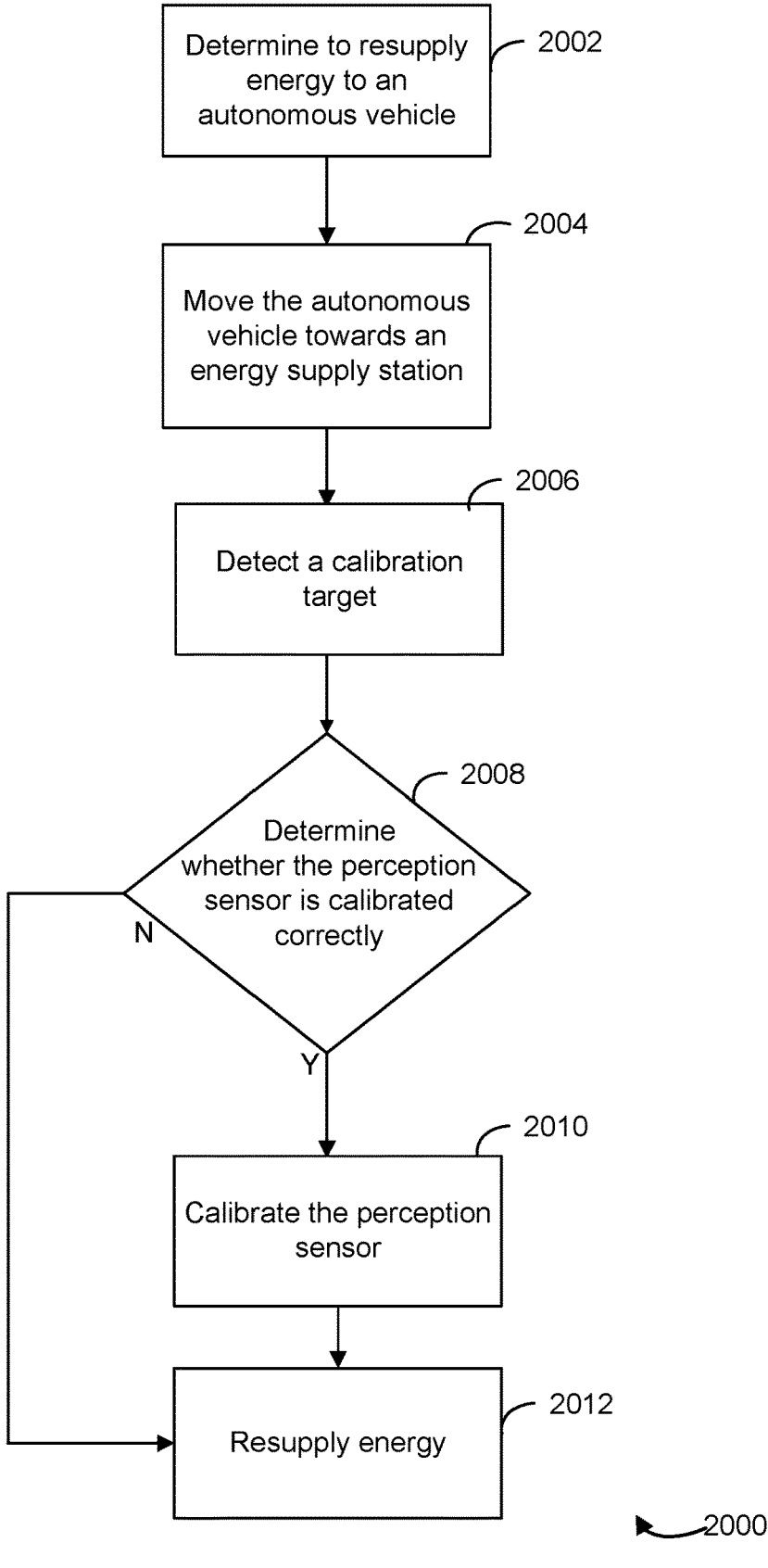
FIG. 20 is a method for calibrating sensors of an autonomous vehicle, according to embodiments.

FIG. 20 shows execution steps of a processor-based method using the system 250, according to some embodiments. The method 2000 shown in FIG. 20 comprises execution steps 2002-2012. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 20 is described as being performed by a data processing system stored or on or otherwise located at an autonomous vehicle, such as the autonomous vehicle 802, 1102, and 1502 depicted in FIGS. 8A-B, 11, and 15. However, in some embodiments, one or more of the steps may be performed by a different processor, server, or any other computing feature. For instance, one or more of the steps may be performed via a cloud-based service or another processor in communication with the processor of a remote server and/or the autonomy system of such a remote server.

At 2002, the data processing system determines to resupply energy to an autonomous vehicle. For example, the autonomous vehicle can detect a level of energy within the autonomous vehicle. The autonomous vehicle can determine the level of energy is insufficient to complete a current route and initiate a resupply operation. At 2004, the data processing system moves the autonomous vehicle towards an energy supply station. For example, the data processing system may automatically control the autonomous vehicle to the energy supply station responsive to determining to resupply energy to the autonomous vehicle.

At 2006, the data processing system detects a calibration target. For example, responsive to a determination of arrival of the autonomous vehicle at the energy supply station, the data processing system may detect, via the perception sensor of the autonomous vehicle, a calibration target. Responsive to the determination of the arrival, the data processing system may scan, via the perception sensor, an environment in which the energy supply station is located and detect the calibration target based on data collected during the scanning. In some cases, the autonomous vehicle may be configured to perform the scanning and calibration target detection as part of the resupply operation.

The calibration target may be located at a location surrounding the autonomous vehicle while at the energy supply station. For example, the target may be located on a surface of the energy supply station (e.g., on top of the energy supply station). The target may be affixed to an object separate from the energy supply station (e.g., located adjacent to the energy supply station). In some cases, the calibration target may include various symbols, features, or surfaces for calibrating the perception sensors. For example, the target may include eight surface targets, including two square shapes and six circles with varied amounts of retro-reflectivity, radar-reflectivity, or high-contrast visual appeal. In some cases, the surface targets may include information detectable by the sensors, such as QR codes or other detectable mediums.

At 2008, the data processing system determines whether the perception sensor is calibrated correctly. For example, the autonomous vehicle may collect data from the perception sensor of the autonomous vehicle corresponding with the calibration target. The data may be position information of the calibration target. The position information may include a predicted position of the calibration target relative to the perception sensor. The data processing system may determine an expected location of the calibration target relative to the autonomous vehicle. For example, the autonomous vehicle may be configured to stop at an object associated with the energy supply station or at a predefined location a specific distance from the target. The predefined location may be a known location relative to the calibration target, indicated in map data.

In some cases, the map data or information of the known location may be stored in memory associated with the autonomous vehicle. In some cases, the autonomous vehicle may receive the map data or the known location information. For example, the autonomous vehicle may transmit a signal to the energy supply station based on the determination of the arrival of the autonomous vehicle at the energy supply station. The autonomous vehicle may receive a response from the energy supply station indicating the actual location of the calibration target (e.g., the map data, the known location). Additionally, or alternatively, the autonomous vehicle may transmit a signal to a remote computer (e.g., a remote server) based on the determination of the arrival. The autonomous vehicle may receive a response from the remote computer indicating the actual location of the calibration target. The autonomous vehicle may compare the position information obtained form the perception sensor to the actual location of the calibration target. If the comparison (e.g., difference) satisfies a threshold, the autonomous vehicle may determine the perception sensors are miscalibrated. For example, the autonomous vehicle may execute algorithms that match the position information against the actual location of the calibration target (e.g., as indicated by the map data). The data processing system may generate high-precision corrected positions based on the ground-points indicated by the geolocation in the map data and/or data received from a GNSS instrument of the automated vehicle.

At 2010, the data processing system calibrates the perception sensor. For example, the autonomous vehicle may be configured to calibrate the perception sensor based on a difference between an actual location of the calibration target relative to the autonomous vehicle and a measured location of the calibration target relative to the autonomous vehicle. In some cases, the autonomous vehicle may generate a position correction of the perception sensor based on a comparison of the predicted position of the calibration target with the expected location of the calibration target indicated by preconfigured location data (e.g., the map data). The autonomous vehicle may calculate a sensor offset and a sensor orientation for the perception sensor using the position correction and the predicted position of the calibration target. The autonomous vehicle may update one or more calibrated settings for the perception sensor using at least one of the sensor offset, the sensor orientation, the position correction, the predicted position, or the expected location. In some cases, the autonomous vehicle may update a vehicle location for the automated vehicle in the one or more calibrated settings.

At 2012, the data processing system resupplies energy to the autonomous vehicle. For example, the autonomous vehicle may perform other steps associated with resupplying energy to the autonomous vehicle while calibrating the perception sensors. The autonomous vehicle may determine completion of the resupply operation after detecting an amount of energy within the vehicle satisfies an energy threshold and the perception sensors have finished calibrating. Responsive to determining the completion of the resupply operation, the autonomous vehicle may continue the current route and move away from the energy supply station.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An autonomous vehicle, comprising:
   a perception sensor; and
   one or more processors configured to:
      automatically control the autonomous vehicle to an energy supply station responsive to determining to resupply energy to the autonomous vehicle;

responsive to a determination of arrival of the autonomous vehicle at the energy supply station, detect, via the perception sensor of the autonomous vehicle, a calibration target;
      collect data from the perception sensor corresponding with the calibration target;
   calibrate the perception sensor based on the collected data;
      detect, based at least in part on the calibrated perception sensor, a predefined object different than the calibration target, wherein the predefined object corresponds to a defined energy resupply location at the energy supply station; and
      control the autonomous vehicle to (i) move, based on the detected predefined object, to the defined energy resupply location at the energy supply station, (ii) adjust a position of the autonomous vehicle to enable the resupply of energy at the energy supply station, and (iii) at the adjusted position, open an energy input receptacle of the autonomous vehicle to receive energy from the energy supply station.

2. The autonomous vehicle of claim 1, wherein the calibration target is located on a surface of the energy supply station.

3. The autonomous vehicle of claim 1, wherein the calibration target is affixed to an object separate from the energy supply station.

4. The autonomous vehicle of claim 1, wherein the one or more processors are further configured to:
   determine an expected location of the calibration target relative to the autonomous vehicle based on an identification of the energy supply station; and
   determine a predicted location of the calibration target relative to the autonomous vehicle based on the collected data,
      wherein the autonomous vehicle is configured to calibrate the perception sensor based on a difference between an actual location of the calibration target relative to the autonomous vehicle and a measured location of the calibration target relative to the autonomous vehicle.

5. The autonomous vehicle of claim 1, wherein the one or more processors are configured to determine an actual location of the calibration target by:
   transmitting a signal to the energy supply station based on the determination of the arrival; and
   receiving a response from the energy supply station indicating the actual location of the calibration target.

6. The autonomous vehicle of claim 1, wherein the one or more processors are configured to determine an actual location of the calibration target by:
   transmitting a signal to a remote computer based on the determination of the arrival; and
   receiving a response from the remote computer indicating the actual location of the calibration target.

7. The autonomous vehicle of claim 1, wherein the one or more processors are configured to detect the calibration target by:
   responsive to the determination of the arrival, scanning, via the perception sensor, an environment in which the energy supply station is located; and
   detecting the calibration target based on data collected during the scanning.

8. The autonomous vehicle of claim 1, wherein the one or more processors configured to collect the data by:
   collecting position information of the calibration target.

9. The autonomous vehicle of claim 1, wherein the one or more processors are configured to calibrate the perception sensor by:

obtaining position information for the calibration target, the position information including a predicted position of the calibration target relative to the perception sensor;

generating a position correction of the perception sensor based on a comparison of the predicted position of the calibration target with an expected location of the calibration target indicated by preconfigured location data;

calculating a sensor offset and a sensor orientation for the perception sensor using the position correction and the predicted position of the calibration target; and updating one or more calibrated settings for the perception sensor using at least one of the sensor offset, the sensor orientation, the position correction, the predicted position, or the expected location.

10. The autonomous vehicle of claim 9, wherein the one or more processors are configured to update the one or more calibrated settings by:

updating a vehicle location for the automated vehicle in the one or more calibrated settings.

11. A method, comprising:

automatically controlling, by one or more processors, an autonomous vehicle to an energy supply station responsive to determining to resupply energy to the autonomous vehicle;

responsive to a determination of arrival of the autonomous vehicle at the energy supply station, detecting, via a perception sensor of the autonomous vehicle, a calibration target;

collecting, by the one or more processors, data from the perception sensor corresponding with the calibration target;

calibrating, by the one or more processors, the perception sensor based on the collected data;

detecting, based at least in part on the calibrated perception sensor, a predefined object different than the calibration target, wherein the predefined object corresponds to a defined energy resupply location at the energy supply station; and controlling the autonomous vehicle to (i) move, based on the detected predefined object, to the defined energy resupply location at the energy supply station, (ii) adjust a position of the autonomous vehicle to enable the resupply of energy at the energy supply station, and (iii) at the adjusted position, open an energy input receptacle of the autonomous vehicle to receive energy from the energy supply station.

12. The method of claim 11, wherein the calibration target is located on a surface of the energy supply station.

13. The method of claim 11, wherein the calibration target is affixed to an object separate from the energy supply station.

14. The method of claim 11, further comprising:

determining an expected location of the calibration target relative to the autonomous vehicle based on an identification of the energy supply station; and determine a predicted location of the calibration target relative to the autonomous vehicle based on the collected data, wherein the autonomous vehicle is configured to calibrate the perception sensor based on a difference between an actual location of the calibration target relative to the autonomous vehicle and a measured location of the calibration target relative to the autonomous vehicle.

15. The method of claim 14, further comprising:

transmitting, by the one or more processors, a signal to the energy supply station based on the determination of the arrival; and receiving a response from the energy supply station indicating the actual location of the calibration target.

16. A controller, comprising:

one or more processors, the one or more processors configured to:

automatically control an autonomous vehicle to an energy supply station responsive to determining to resupply energy to the autonomous vehicle;

responsive to a determination of arrival of the autonomous vehicle at the energy supply station, detect, via a perception sensor of the autonomous vehicle, a calibration target;

collect data from the perception sensor corresponding with the calibration target;

calibrate the perception sensor based on the collected data;

detect, based at least in part on the calibrated perception sensor, a predefined object different than the calibration target, wherein the predefined object corresponds to a defined energy resupply location at the energy supply station; and control the autonomous vehicle to (i) move to a defined energy resupply location at the energy supply station, (ii) adjust a position of the autonomous vehicle to enable the resupply of energy at the energy supply station, and (iii) at the adjusted position, open an energy input receptacle of the autonomous vehicle to receive energy from the energy supply station.

17. The controller of claim 16, wherein the calibration target is located on a surface of the energy supply station.

18. The controller of claim 16, wherein the calibration target is affixed to an object separate from the energy supply station.

19. The controller of claim 16, wherein the one or more processors are further configured to:

determine an expected location of the calibration target relative to the autonomous vehicle based on an identification of the energy supply station; and determine a predicted location of the calibration target relative to the autonomous vehicle based on the collected data, wherein the autonomous vehicle is configured to calibrate the perception sensor based on a difference between an actual location of the calibration target relative to the autonomous vehicle and a measured location of the calibration target relative to the autonomous vehicle.

20. The controller of claim 19, wherein the one or more processors are configured to determine the actual location of the calibration target by:

transmitting a signal to the energy supply station based on the determination of the arrival; and receiving a response from the energy supply station indicating the actual location of the calibration target.

* * * * *